(12) United States Patent
Ye et al.

(10) Patent No.: US 10,882,729 B2
(45) Date of Patent: Jan. 5, 2021

(54) BEVERAGE PRESERVATION KEG WITH ADJUSTABLE BEER TAP

(71) Applicant: NINGBO MAJOR DRAFT BEER EQUIPMENT CO., LTD, Ningbo (CN)

(72) Inventors: Xiaoyang Ye, Ningbo (CN); Bangcai Luo, Ningbo (CN)

(73) Assignee: NINGBO MAJOR DRAFT BEER EQUIPMENT CO., LTD, Ningbo (CN)

(*) Notice: Subject to any disclaimer, the term of this patent is extended or adjusted under 35 U.S.C. 154(b) by 0 days.

(21) Appl. No.: 16/567,420

(22) Filed: Sep. 11, 2019

(65) Prior Publication Data
US 2020/0087137 A1  Mar. 19, 2020

(30) Foreign Application Priority Data

Sep. 14, 2018 (CN) .......................... 2018 1 1073149
Sep. 14, 2018 (CN) ..................... 2018 2 1504538 U

(51) Int. Cl.
  *B67D 1/12*   (2006.01)
  *B67D 1/04*   (2006.01)
  *F16K 17/04*  (2006.01)
  *B67D 1/08*   (2006.01)
  *B67D 1/00*   (2006.01)

(52) U.S. Cl.
  CPC ......... *B67D 1/1281* (2013.01); *B67D 1/0082* (2013.01); *B67D 1/0406* (2013.01); *B67D 1/0838* (2013.01); *F16K 17/04* (2013.01); *B67D 1/0437* (2013.01); *B67D 2001/0089* (2013.01)

(58) Field of Classification Search
  CPC .. B67D 1/0437; B67D 1/0082; B67D 1/0406; B67D 1/1281
  USPC ............................. 222/95, 105, 400.7, 400.8
  See application file for complete search history.

(56) References Cited

U.S. PATENT DOCUMENTS

| | | | | |
|---|---|---|---|---|
| 2,899,170 A | * | 8/1959 | Cornelius | B67D 1/1466 251/122 |
| 3,024,800 A | * | 3/1962 | Crisp | B67D 1/0437 137/209 |
| 3,361,152 A | * | 1/1968 | Akers | C07D 453/02 137/212 |
| 3,520,323 A | * | 7/1970 | Lamb | B67D 1/125 137/212 |

(Continued)

*Primary Examiner* — Vishal Pancholi
(74) *Attorney, Agent, or Firm* — Charles C. Achicar; Ostrolenk Faber LLP

(57) ABSTRACT

The present invention provides a beverage preservation keg with an adjustable beer tap, including a shell, an inner container, and a gas-liquid control device; the inner container includes an upper gas storage chamber and a lower beer storage chamber; the gas-liquid control device includes a keg spear, a dispenser and a beer discharge pipe; the keg spear matches and communicates with the gas storage chamber and the beer storage chamber, and the top end of the keg spear matches and is connected to the dispenser; the dispenser is connected to the matching beer discharge pipe. The present invention has the function of adjusting the beer flow rate, and the keg spear is provided with a pressure relief valve, which eliminates the need for a gas tube and a separate pressure relief valve to connect the keg spear to the gas storage chamber in series.

21 Claims, 21 Drawing Sheets

(56) References Cited

U.S. PATENT DOCUMENTS

| | | | | |
|---|---|---|---|---|
| 3,596,809 | A * | 8/1971 | Taubenheim | B67D 1/0831 222/400.7 |
| 3,698,417 | A * | 10/1972 | Smith | B67D 1/0802 137/212 |
| 4,921,135 | A * | 5/1990 | Pleet | B67B 7/26 222/105 |
| 5,246,140 | A * | 9/1993 | Thix | B67D 1/0412 222/131 |
| 5,415,329 | A * | 5/1995 | Westlund | B67D 1/0832 222/397 |
| 5,690,136 | A * | 11/1997 | Celli | B67D 1/0832 137/212 |
| 6,015,068 | A * | 1/2000 | Osgar | B67D 7/344 222/400.7 |
| 6,105,825 | A * | 8/2000 | Gomi | B67D 1/0832 222/146.6 |
| 6,820,775 | B2 * | 11/2004 | Meike | B67D 1/04 222/386.5 |
| 2004/0134939 | A1 * | 7/2004 | van der Klaauw | B67D 1/0832 222/400.7 |
| 2014/0103066 | A1 * | 4/2014 | Geert Norbert | B67D 1/0801 222/95 |

* cited by examiner

//BEVERAGE PRESERVATION KEG WITH ADJUSTABLE BEER TAP

CROSS REFERENCE TO RELATED APPLICATIONS

The present application claims priority to China Application No. 201811073149.7 filed on Sep. 14, 2018 and China Application No. 201821504538.6 filed Sep. 14, 2018, the subject matter of each of which are incorporated herein by reference in their entirety.

TECHNICAL FIELD

The present invention belongs to the technical field of beer preservation kegs, and particularly to a beverage preservation keg with an adjustable beer tap.

BACKGROUND ART

Draft beer is beer filtered through a microporous membrane, while ordinary beer is high-temperature pasteurized beer. Different from high-temperature pasteurized bottled or canned beer and different from unpasteurized bulk beer, draft beer is a high-quality nutritious beer that is purely natural and unsweetened, without pigments, preservatives and artificial flavors. Draft beer is a wonder in the kingdom of beer, and its share in the world's beer consumption is getting higher and higher. Draft beer, which is known as "beer juice", is the best quality filtered beer that is directly injected into a fully-sealed stainless-steel keg from the production line and charged with carbon dioxide with a draft beer machine and controlled at a temperature of 3-8° C. with the draft beer machine before drinking. To drink it, the draft beer is served directly from the draft beer machine into a beer mug to avoid direct contact between the beer and air, so that the beer is fresher, purer and richer in foam, and gives a more refreshing mouthfeel and a great lingering aftertaste. The microzyme contained in draft beer has the functions of promoting gastric secretion, increasing appetite, and enhancing digestion. However, draft beer must be sold and stored using complex special equipment, which limits its popularity and prevents it from entering ordinary households.

With the development of the draft beer container technology, the commonly used beer container adopts a gas supply device (providing carbon dioxide) and a beer keg that are disposed separately, and thus is very inconvenient to carry. The Lager Beer Mini Keg 5L launched by Heineken has made up for the above defects and can keep the quality of fresh keg beer to the last drop. However, the keg cannot be reused, and thus, is high in price and is not environmentally friendly. Meanwhile, the carbon dioxide compression system (fixed with glue) attached to the keg is mixed with beer, which makes consumers doubt its hygiene. Therefore, designing a product to solve the above-mentioned defect of beer packaging and achieving low-cost supply of high-quality fresh beer to consumers have become an urgent problem to be solved. The common beer container has a fixed liquid flow when discharging beer, and it is impossible to control the beer discharge flow, which makes it very inconvenient for people to use.

A keg spear is the beer discharge valve for the draft beer keg. It is an indispensable part of the draft beer container and has a function of achieving the purpose of filling and discharging beer through the exchange of CO2 and draft beer. The commonly used keg spears now require a pressure relief valve and a gas tube to be connected to the carbon dioxide gas storage chamber, which makes it very inconvenient to assemble and disassemble. Moreover, the gas tube is prone to collide with other objects to be damaged, causing gas leakage and resulting in frequent replacement of the gas tube component, and the damage of the gas tube is also likely to cause the beer to become spoiled due to gas leakage.

In addition, the gas inside the gas supply device of the ordinary beer container is constant, and when the inside gas is used up, it cannot be charged with gas, so that it can no longer be reused. When the internal gas pressure is not enough, if there is still remaining draft beer, the remaining draft beer will not be able to come out, resulting in waste. Therefore, it is essential to equip the draft beer container with a gas charging valve. The gas charging valve is a non-return valve that can charge gas in one direction. An ordinary gas charging valve usually blocks reverse flow by an elastic device. When the elastic device fails, the one-direction flow function will not exist.

SUMMARY

(I) Technical Problem to be Solved

The technical problem to be solved by the present invention is to provide a beverage preservation keg with adjustable beer discharge flow and a keg spear with a pressure relief valve.

(II) Technical Solution

In order to solve the above technical problem, the present invention provides a beverage preservation keg with an adjustable beer tap, including a shell, an inner container wrapped by the shell, and a gas-liquid control device. The inner container is divided into an upper layer and a lower layer, including an upper gas storage chamber for storing a gas and a lower beer storage chamber for storing a liquid. The gas-liquid control device includes a keg spear with a pressure relief valve, a dispenser with a beer tap throttle valve, and a beer discharge pipe. The keg spear matches and connects the gas storage chamber and the beer storage chamber, and the top end of the keg spear matches and is connected to the dispenser. The dispenser is connected to a matching beer discharge pipe.

The keg spear communicates with a gas passage between the gas storage chamber and the beer storage chamber. The keg spear, the dispenser and the beer discharge pipe communicate with the liquid passage pipe from the beer storage chamber to the outside. The dispenser with the beer tap throttle valve is capable of controlling and adjusting the liquid flow of beer being discharged.

The dispenser includes a dispenser seat, a beer tap, an operating device and a throttle valve. The center of the dispenser seat is provided with a beer tap receiving hole for movably receiving the beer tap. The operating device matches and is respectively connected to the dispenser seat and the beer tap. The beer tap is controlled by the operating device to perform a beer tap movement in the beer tap receiving hole of the dispenser seat. The throttle valve matches and is mounted in the beer tap, and the throttle valve can adjust the liquid flow inside the beer tap.

The bottom end of the beer tap is provided with a liquid inlet in fluid communication with the keg spear, and the side edge of the beer tap is provided with a liquid outlet that matches and is connected to the beer discharge pipe. The top end of the beer tap is further provided with a throttle valve mounting hole matching the throttle valve, the bottom end of the throttle valve mounting hole matches and communicates with the liquid inlet, and the side edge of the throttle valve mounting hole matches and communicates with the liquid outlet. The throttle valve includes a valve body matching the throttle valve mounting hole, and a valve switch for controlling an up-and-down movement of the valve body.

When the valve switch controls the valve body to move downward until the valve body is inserted into and sealed by the throttle valve mounting hole, the liquid inlet is in communication with the liquid outlet through the throttle valve mounting hole, and the beer discharge passage inside the beer tap is closed. When the valve switch controls the valve body to move upward until the valve body and the throttle valve mounting hole are gradually separated to form a gap, the liquid inlet communicates with the liquid outlet through the gap inside the throttle valve mounting hole, and the beer discharge passage inside the beer tap is opened.

The valve body includes a lower valve body having a cone structure with a larger top and a smaller bottom, and an upper valve body which matches and is coaxially connected and fixed to the top end of the lower valve body. The bottom section of the throttle valve mounting hole is a conical hole matching the cone structure of the lower valve body. The valve switch is a knob switch, and the middle of the knob switch is provided with a coaxial, positioning and coupling through hole. The top end of the upper valve body is provided with a coaxial, positioning and mating protrusion which is integrally connected and matches the positioning and coupling through hole, and the top end of the positioning and mating protrusion is provided with a coaxial, threaded fixing hole.

The knob switch is fitted onto the positioning and mating protrusion through the positioning and mating through hole and realizes linkage fixation between the knob switch and the valve body through a threaded connection between a valve body screw and the threaded fixing hole. The knob switch is in a threaded connection with the top end of the beer tap, and the knob switch adjusts the up-and-down movement of the linked valve body inside the throttle valve mounting hole through adjusting the thread connection with the beer tap.

The throttle valve further includes a valve body limiting member, the middle of the valve body limiting member is provided with a coaxial through hole, and the bore diameter of the through hole is smaller than the maximum outer diameter of the valve body. The valve body limiting member is in a detachable and fixed connection with the top of the beer tap.

The top end of the dispenser seat is provided with two vertically distributed operating support poles, and the distances from the two operating support poles to the axial line of the beer tap receiving hole are equal. The operating device includes a U-shaped movable plate and a handle. The two top ends of the U-shaped movable plate respectively match and are hinged with the top ends of the two operating support poles through bolts, and the middle of the tail end of the U-shaped movable plate matches and is connected to the handle. Inner side walls of two side plates of the U-shaped movable plate are provided with symmetrically disposed cylindrical keys. Two sides of the top end of the beer tap are provided with symmetrically and horizontally distributed slideways, and the width of the slideway matches the cross-sectional diameter of the cylindrical key.

The top surface of the dispenser seat is further provided with a vertically disposed gear plate, the gear plate is close to an inner side wall of the tail end of the U-shaped movable plate, and the surface of the gear plate close to the inner side wall of the tail end of the U-shaped movable plate is as a cambered surface matching the movement of the U-shaped movable plate.

The handle includes a fixed grip, an ejector rod, an ejector rod return spring and a movable grip. The fixed grip is integrally connected with the middle of the tail end of the U-shaped movable plate, and the inside of the fixed grip is provided with a first counterbore which is a through hole. The larger bore opening of the first counterbore runs through the middle of the tail end of the U-shaped movable plate. The ejector rod includes an ejector head, a larger cylindrical section matching and mated with the larger bore diameter of the first counterbore, and a smaller cylindrical section matching and mated with the smaller bore diameter of the first counterbore, which are coaxially and integrally connected in sequence, and the tail end of the smaller cylindrical section is provided with a circlip groove. After running through the first counterbore, the ejector rod fixes the circlip groove to the tail end of the fixed grip through a gasket and a circlip, and the outer diameter of the gasket is larger than the outer diameter of the fixed grip. The ejector rod return spring is disposed between the larger bore bottom end of the first counterbore and the larger cylindrical section and matches and is mated with the smaller cylindrical section. The inside of the movable grip is provided with a second counterbore running through the front and the rear, the smaller bore diameter of the second counterbore matches and is mated with the outer diameter of the fixed grip, and the larger bore diameter of the second counterbore matches and is mated with the outer diameter of the gasket.

The cambered surface is provided with a first gear slot, a second gear slot and a third gear slot which match the ejector head in sequence from top to bottom.

The keg spear includes a keg spear seat, a pressure relief valve, an inner tube fixing sleeve, an inner tube fixing spring and an inner tube assembly. The pressure relief valve is disposed at an appropriate location on the outer side surface of the keg spear seat, and the pressure inlet of the pressure relief valve matches and communicates with the gas storage chamber. The top end of the keg spear seat is provided with a beer tap movable hole matching the beer tap of the dispenser, the side surface of the beer tap movable hole is provided with a valve device that is linked to and matches the beer tap, and the valve device respectively communicates with the stable pressure outlet of the pressure relief valve and the beer tap movable hole.

The pressure relief valve includes a valve body casing, a first compression spring, a mushroom-shaped first ejector rod, a second compression spring and a pressing block. The first compression spring, the first ejector rod, the second compression spring and the pressing block are coaxially distributed in sequence from left to right in the valve body casing. The first ejector rod includes a telescopic rod and a mushroom head which are coaxially and integrally connected.

The valve body casing includes a front casing and a rear casing. The front end of the front casing is provided with a third counterbore which is a through hole, and the smaller bore diameter of the third counterbore matches the outer diameter of the telescopic rod. The rear casing is provided with, in the sequence from front to rear, a mushroom head receiving hole, a pressing block receiving hole and a pressing hole which have coaxial communication, the bore diameter of the mushroom head receiving hole matches the outer diameter of the mushroom head, the bore diameter of the pressing block receiving hole matches the outer diameter of the pressing block, and the bore diameter of the pressing hole is smaller than the diameter of the pressing block receiving hole. The outer side of the rear end of the front casing is provided with a first threaded section coaxial with the third counterbore, and the front end of the mushroom head receiving hole is provided with a first threaded hole matching the first threaded section.

The front casing and the rear casing achieve a fixed connection through the matching threaded connection between the first threaded section and the first threaded hole. The mushroom head of the first ejector rod matches and is inserted into the mushroom head receiving hole, and the telescopic rod of the first ejector rod matches and is inserted into the smaller bore of the third counterbore. The first compression spring matches and is slipped onto the telescopic rod and disposed between the rear end surface of the front casing and the bottom of the mushroom head. The pressing block matches and is inserted into the pressing block receiving hole. The second compression spring is disposed between the top of the mushroom head and the pressing block. The pressure inlet of the pressure relief valve is a larger bore opening end of the third counterbore axially covered by the top end of the telescopic rod, and the stable pressure outlet of the pressure relief valve is a larger bore opening end of the third counterbore that is not axially covered by the top end of the telescopic rod.

The rear end of the pressing block is further provided with a coaxial ejector column, and the outer diameter of the ejector column matches the bore diameter of the pressing hole, and the ejector column protrudes from the rear end of the rear casing.

The keg spear with the pressure relief valve further includes an adjustment knob, and the front end of the adjustment knob is provided with a second threaded hole which is not a through hole. The outer side of the rear end of the rear casing is provided with a second threaded section matching the second threaded hole. The adjustment knob achieves a fixed connection with the rear end of the rear casing through the matching threaded connection between the second threaded hole and the second threaded section, and the hole bottom of the second threaded hole abuts against the tail end of the ejector column.

The top of the mushroom head is provided with a coaxial first compression spring receiving hole that matches the second compression spring, the front end of the pressing block is provided with a coaxial second compression spring receiving hole that matches the second compression spring, and the two ends of the second compression spring are respectively inserted into the first compression spring receiving hole and the second compression spring receiving hole.

A first O-ring is disposed between the smaller bore of the third counterbore and the telescopic rod. A second O-ring is disposed between the mushroom head receiving hole and the mushroom head. A third O-ring is disposed between the pressing hole and the ejector column.

The side edge of the top end of the telescopic rod is provided with a radial side hole, and the side hole communicates with the larger bore of the third counterbore, and the side hole is disposed at the front end of the first O-ring. The top of the mushroom head of the first ejector rod is provided with a vent hole communicating with the side hole.

The valve device includes a screw, an ejector block return spring, an ejector block and a second ejector rod. The outer side surface of the top end of the keg spear seat is provided with a threaded hole matching the screw, the tail end of the threaded hole is provided with a gas hole communicating with the beer tap movable hole, and the gas hole matches and is mated with the second ejector rod. The tail end of the second ejector rod matches and is connected to the ejector block. The tail end of the screw is provided with a receiving hole matching the ejector block, and the ejector block return spring is disposed between the ejector block and the bottom end of the receiving hole. The outer side surface of the screw is provided with a fourth O-ring matching the threaded hole. The stable pressure outlet of the pressure relief valve matching and communicating with the threaded hole.

The bottom end of the keg spear seat is provided with a fourth counterbore communicating with the beer tap movable hole, and the inner wall of the larger bore of the fourth counterbore is fixedly connected to the outer wall of the inner tube fixing sleeve through a thread.

The inner tube assembly includes an inner tube, an intake sealing ring, a plug and a plug return spring. The intake sealing ring is disposed at the top end of the inner tube. The middle portion of the inner tube is provided with a plurality of inner bosses uniformly distributed in a circular array with its axial line as an axis. The plug return spring is disposed between the inner bosses and the plug, and the plug is pressed upward against and sealed with the inner ring of the intake sealing ring under the action of the spring force of the plug return spring. The top surface of the inner tube fixing sleeve is provided with a fifth counterbore running through the bottom surface, and the smaller bore of the fifth counterbore and the inner tube are mated in a clearance fit. The outer side surface of the inner tube near the top end is provided with a step surface projecting outward, and the inner tube fixing spring is disposed between the bottom surface of the larger bore of the fifth counterbore and the step surface and matches and is slipped onto the inner tube.

A portion of the fourth counterbore in communication with the beer tap movable hole is provided with an annular protrusion. The outer ring of the intake sealing ring is pressed upward against and sealed with the annular protrusion under the action of the spring force of the inner tube fixing spring.

The inside of the keg spear seat is provided with a first hole communicating with the stable pressure outlet of the pressure relief valve and the valve device. The top end of the inner tube fixing sleeve is provided with a second hole communicating with the gas storage chamber, and the top end of the inner tube fixing sleeve is further provided with a coaxial, annular groove communicating with the second hole. The bottom surface of the larger bore of the fourth counterbore is provided with a third hole communicating with the pressure inlet of the pressure relief valve, and the distance of the third hole from the opening end of the bottom surface of the larger bore of the fourth counterbore to the axial line of the fourth counterbore is equal to the radius of the annular groove.

A sealing gasket is disposed between the top surface of the inner tube fixing sleeve and the bottom surface of the larger bore of the third counterbore, and a hole diameter of the sealing gasket is smaller than a hole diameter of the annular groove. The threaded connection portion between the inner wall of the larger bore of the fourth counterbore and the outer wall of the inner tube fixing sleeve is provided with a fifth O-ring. The top end of the telescopic rod of the first ejector rod is provided with a rubber block that matches and is connected to the top end.

The bottom end of the dispenser seat is provided with a curved snap-on plate and a pin assembly. The side edge of the top surface of the keg spear seat is provided with a coaxial, annular step. The curved snap-on plate is provided with a curved snap-on groove to horizontally snap onto the annular step. The curved surface extension surface of the curved snap-on groove is tangent to the side surface of the bottom end of the pin assembly.

The pin assembly includes a pin seat, a pin, a return spring and a grip. The pin seat is integrally connected to the side edge of the bottom end of the dispenser seat, and the top surface of the pin seat is provided with a grip hole, a pin hole and a spring hole which are in vertical communication and are and coaxially disposed in sequence. The bore diameter of the pin hole is smaller than the bore diameter of the grip hole, and the bore diameter of the pin hole is smaller than the bore diameter of the spring hole. The grip is matches and is inserted into the grip hole, the pin matches and is inserted into the pin hole, and the top end of the pin matches and is connected to the bottom end of the grip. The side edge of the bottom end of the pin is provided with a protruding ring matching the spring hole, and the return spring is disposed between the bottom surface of the spring hole and the protruding ring and matches and is slipped onto the pin. The curved surface extension of the curved snap-on groove is tangent to the side surface of the bottom end of the pin.

The beverage preservation keg with an adjustable beer tap further includes a gas charging valve matching and communicating with the gas storage chamber. The gas charging valve includes a gas charging valve connector, a gas charging valve body, a valve core, a valve core return spring and a gas charging valve plug. The outer side of the bottom end of the gas charging valve body is provided with a fixed threaded section, and the middle of the gas charging valve connector is provided with a fixed threaded hole that is coaxially bored and matches the fixed threaded section. The bottom end of the gas charging valve body is provided with a coaxial spring mounting hole that matches the valve core return spring, the top end of the gas charging valve body is provided with a coaxial gas charging counterbore communicating with the spring mounting hole, and the smaller bore diameter of the gas charging counterbore is smaller than the bore diameter of the spring mounting hole. The outer diameter of the valve core is larger than the smaller bore diameter of the gas charging counterbore, and the outer diameter of the valve core is smaller than the bore diameter of the spring mounting hole. The top end of the valve core is provided with a coaxial ejector pin that is mated with the gas charging counterbore in a clearance fit. The middle of the gas charging valve plug is provided with a plug vent hole which is a through hole.

The gas charging valve body and the gas charging valve connector achieve a fixed connection through the matching threaded connection between the fixed threaded section and the fixed threaded hole. The valve core, the valve core return spring and the gas charging valve plug are connected and mounted in the spring mounting hole of the gas charging valve body in sequence from top to bottom. The ejector pin of the valve core is inserted into the smaller bore of the gas charging counterbore in a clearance fit and further into the larger bore of the gas charging counterbore. The gas charging valve plug matches and is fixed to the bottom end of the spring mounting hole. The valve core return spring is disposed between the bottom end of the valve core and the top end of the gas charging valve plug.

The valve core includes the ejector pin, a sealing ring and a core body. The top end of the core body is provided with a receiving counterbore which is not a through hole. The outer diameter of the sealing ring matches the larger bore diameter of the receiving counterbore, and the thickness of the sealing ring matches the larger bore depth of the receiving counterbore. The central hole diameter of the sealing ring matches the smaller bore diameter of the receiving counterbore. The bottom end of the ejector pin is provided with a coaxial receiving rod that matches the smaller bore of the receiving counterbore.

The sealing ring matches and is inserted into in the larger bore of the receiving counterbore of the core body, and the receiving rod of the ejector pin runs through the central hole of the sealing ring and matches and is inserted into the smaller bore of the receiving counterbore.

The shell includes a casing, a base and a cover plate. The inside of the casing is provided with an inner container mounting hole matching the inner container of the draft beer preservation keg, and the outer side of the top end of the casing is provided with two symmetrically distributed lifting handles. The base is a socket ring matching and being fixedly connected to the bottom end of the casing. The cover plate matches and is fixedly connected to the top end of the casing through a detachable structure and covers a top opening of the inner container mounting hole.

The outer side of the top end of the casing is provided with an annular movable sleeve, the outer side of the top end of the casing is further provided with a second annular snap groove, the inner side of the bottom end of the annular movable sleeve is provided with a second snap ring matching the second annular snap groove, and the annular movable sleeve achieves a detachable snap connection with the casing through the snap connection of the second snap ring to the second annular snap groove. The two lifting handles are integrally connected to the bottom end of the annular movable sleeve and symmetrically disposed. The lifting handle is a curved plate coaxial with the annular movable sleeve, and the side surface of the curved plate is provided with a lifting handle hole for hand insertion.

The lifting handle is an n-shaped bent rod, and two opening ends at the bottom of the n-shaped bent rod match and are fixedly connected to the outer side of the top end of the casing. The two n-shaped bent rods are symmetrically disposed on two sides of the top end of the casing.

A top end opening of the inner container mounting hole is provided with an annular liner that matches and is fixedly inserted into the hole. An inner hole wall of the annular liner is provided with at least two first inclined protruding strips uniformly distributed in a circular array with its axial line as an axis. The outer side of the cover plate is provided with matching second inclined protruding strips that correspond individually to each of the inclined protruding strips, and all the second inclined protruding strips are uniformly distributed in a circular array with the axial line of the cover plate as an axis.

The cover plate achieves a detachable and fixed connection with the casing at the top end of the casing through an axially limiting connection between the first inclined protruding strips and the second inclined protruding strips.

(III) Beneficial Effects

Compared with the prior art, the inside of the beer tap of the dispenser of the present invention is provided with the throttle valve, so that the device can adjust the beer discharging flow through the dispenser. The structure of the keg spear with the pressure relief valve can eliminate the gas tube and the pressure relief device connected in series between the keg spear and the gas storage chamber, so that the structure and assembly of the beverage preservation keg are simpler and more straightforward, which is both economical and practical.

The throttle valve disposed inside the beer tap of the dispenser can be used for controlling the opening and closing between the liquid outlet and the liquid inlet in the beer tap, thereby achieving the purpose of controlling the liquid flow inside the beer tap, so that the dispenser has the function of controlling the beer discharging flow, which is convenient for the user to adjust the beer discharging flow according to needs. The valve switch of the throttle valve adopts a knob switch structure to realize the opening and closing, which is simple in structure and convenient to operate. The valve body limiting member is disposed such that the valve body is not completely pulled up together with the valve switch, thereby effectively preventing beer from coming out of the throttle valve mounting hole.

The keg spear of the present invention is provided with the pressure relief valve, so the opening and closing of the valve device can be controlled by the up-and-down movement of the beer tap of the dispenser, thereby controlling the opening and closing of the pressure relief valve, and thus, the device directly communicates with the gas storage chamber and the beer storage chamber without a gas tube, which saves space and facilitates assembly. By adopting the valve device composed of the screw, the ejector block return spring, the ejector block and the ejector rod, as long as the beer tap ejects the second ejector rod away against the spring force of the ejector block return spring during the movement, carbon dioxide gas can be guided into the piston movable hole of the keg spear seat. The pressure relief valve can adjust the output stable pressure through the thread structure of the adjustment knob, which is simple in structure and convenient to operate. Moreover, the sealing gasket disposed between the top surface of the inner tube fixing sleeve and the bottom surface of the larger bore of the third counterbore can increase the sealing performance of the joint between the two and prevent the gas from directly entering the beer storage chamber from the gas storage chamber.

The gas charging valve of the present invention utilizes the resetting force of the valve core return spring and the gas pressure inside the gas chamber of the draft beer preservation keg, and the two together act to prevent the gas in the gas chamber of the draft beer preservation keg from leaking out from the gas charging valve, thereby improving the sealing performance of the gas charging valve. When the resetting force of the valve core return spring fails, as long as the gas pressure in the gas chamber of the draft beer preservation keg is large enough, the gas pressure can also act alone on the valve core to seal the lower end port of the gas charging counterbore to prevent the gas from leaking out from the gas charging valve, thereby effectively improving the service life of the gas charging valve.

Figure 1:
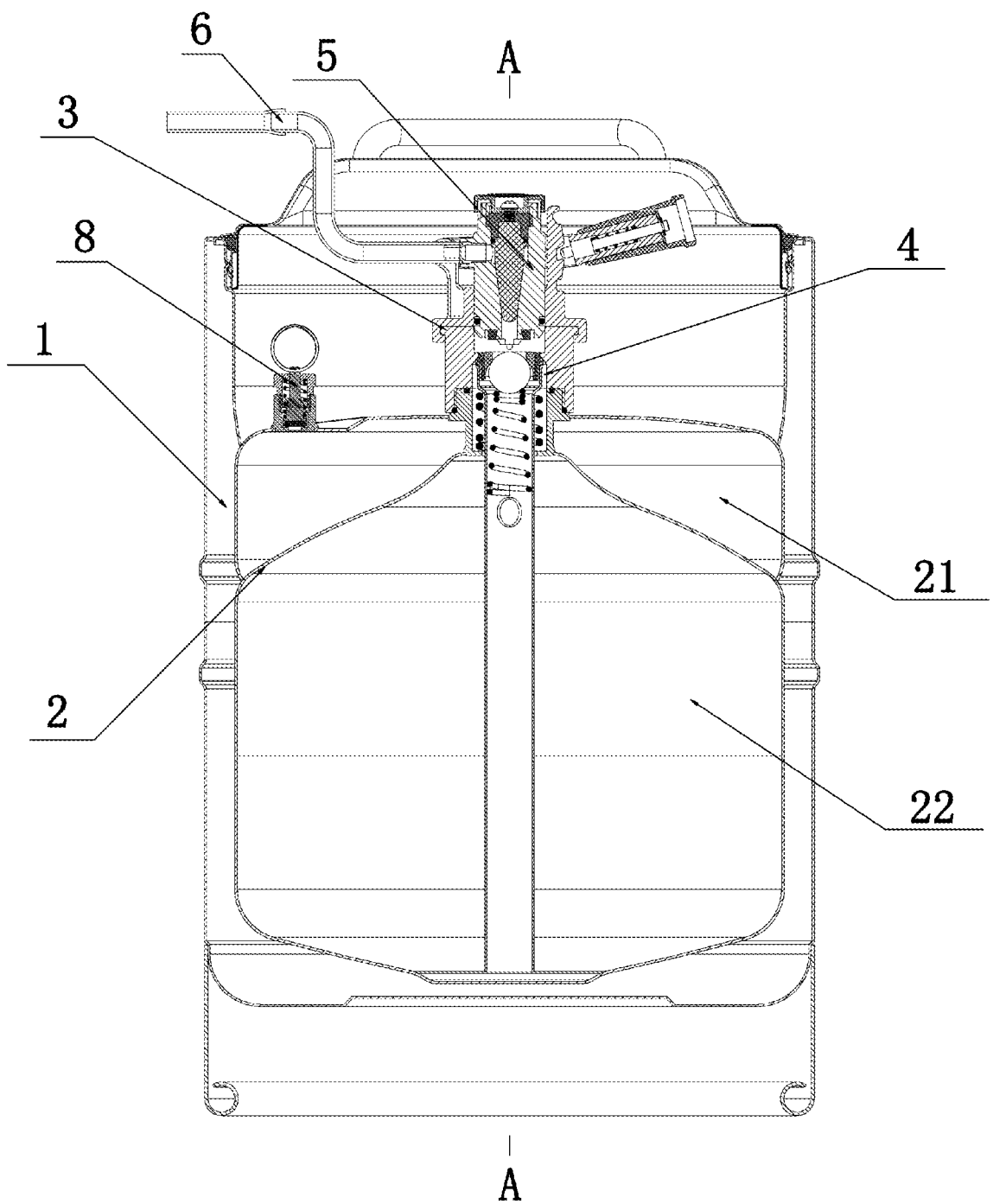
FIG. 1 is a schematic cross-sectional view showing the structure of a beverage preservation keg with an adjustable beer tap according to the present invention.

Reference symbols: 1, shell; 2, inner container; 3, gas-liquid control device; 4, keg spear; 5, dispenser; 6, beer discharge pipe; 7, gas charging valve; 8, pressure maintaining valve; 11, casing; 12, base; 13, cover plate; 21, gas storage chamber; 22, beer storage chamber; 41, keg spear seat; 42, pressure relief valve; 43, inner tube fixing sleeve; 44, inner tube fixing spring; 45, inner tube assembly; 46, fifth O-ring; 51, dispenser seat; 52, beer tap; 53, operating device; 54, throttle valve; 55, bolt; 71, gas charging valve connector; 72, gas charging valve body; 73, valve core; 74, valve core return spring; 75, gas charging valve plug; 76, protective cover; 77, first O-ring seal; 78, second O-ring seal; 81, pressure maintaining valve seat; 82, pressure maintaining valve body; 83, pressure maintaining valve core; 84, pressure maintaining return spring; 85, pull ring; 111, inner container mounting hole; 112, lifting handle; 113, first annular snap groove; 114, annular movable sleeve; 115, second annular snap groove; 116, annular liner; 121, first snap ring; 131, linear handle; 132, n-shaped handle; 133, fixing screw; 134, second inclined protruding strip; 135, cover plate sealing ring; 411, beer tap movable hole; 412, valve device; 413, threaded hole; 414, gas hole; 415, fourth counterbore; 416, annular protrusion; 417, first hole; 418, third hole; 419, annular step; 421, valve body casing; 422, first compression spring; 423, first ejector rod; 424, second compression spring; 425, pressing block; 426, adjustment knob; 427, first O-ring; 428, second O-ring; 429, third O-ring; 431, fifth counterbore; 432, sealing gasket; 433, second hole; 434, annular groove; 451, inner tube; 452, intake sealing ring; 453, plug; 454, plug return spring; 511, beer tap receiving hole; 512, operating support pole; 513, gear plate; 514, curved snap-on plate; 515, pin assembly; 521, liquid inlet; 522, liquid outlet; 523, throttle valve mounting hole; 524, slideway; 525, O-ring mounting groove; 526, O-ring; 527, chamfer; 531, U-shaped movable plate; 532, handle; 533, cylindrical key; 541, valve body; 542, valve switch; 543, valve body screw; 544, valve body limiting member; 711, fixed threaded hole; 721, fixed threaded section; 722, spring mounting hole; 723, gas charging counterbore; 724, protruding ring; 725, connecting hole; 726, regular hexagnal body; 731, ejector pin; 732, sealing ring; 733, core body; 734, limit guiding column; 751, plug vent hole; 761, connecting rod; 811, valve body threaded hole; 812, pressure maintaining vent hole; 821, valve body threaded section; 822, pressure maintaining return spring mounting hole; 1121, curved plate; 1122, lifting handle hole; 1123, n-shaped bent rod; 1141, second snap ring; 1161, first inclined protruding strip; 1321, screw through hole; 1322, handle cover; 4121, screw; 4122, ejector block return spring; 4123, ejector block; 4124, second ejector rod; 4211, front casing; 4212, rear casing; 4231, telescopic rod; 4232, mushroom head; 4251, ejector column; 4252, second compression spring receiving hole; 4261, second threaded hole; 4511, inner boss; 4512, step surface; 5131, cambered surface; 5141, curved snap-on groove; 5151, pin seat; 5152, pin; 5153, return spring; 5154, grip; 5231, conical hole; 5321, fixed grip; 5322, ejector rod; 5323, ejector rod return spring; 5324, movable grip; 5325, gasket; 5326, circlip; 5411, lower valve body; 5412, upper valve body; 5421, knob switch; 5441, through hole; 7211, limit step surface; 7311, receiving rod; 7331, receiving counterbore; 41211, receiving hole; 41212, second O-ring; 42111, third counterbore; 42112, first threaded section; 42113, third compression spring receiving hole; 42121, mushroom head receiving hole; 42122, pressing block receiving hole; 42123, pressing hole; 42124, first threaded hole; 42125, second threaded section; 42311, side hole; 42312, rubber block; 42321, first compression spring receiving hole; 42322, annular compression spring receiving hole; 42323, vent hole; 51311, first gear slot; 51312, second gear slot; 51313, third gear slot; 51511, grip hole; 51512, pin hole; 51513, spring hole; 51521, protruding Ring; 53211, first counterbore; 53221, ejector head; 53222, larger cylindrical section; 53223, smaller cylindrical section; 53224, circlip groove; 53241, second counterbore; 54121, positioning and mating protrusion; 54122, threaded fixing hole; 54211, positioning and coupling through hole; 54212, indicator cover plate.

DETAILED DESCRIPTION

The present invention is further described below with reference to the drawings and embodiments. The following embodiments are intended to illustrate the present invention but are not intended to limit the scope of the present invention.

Figure 2:
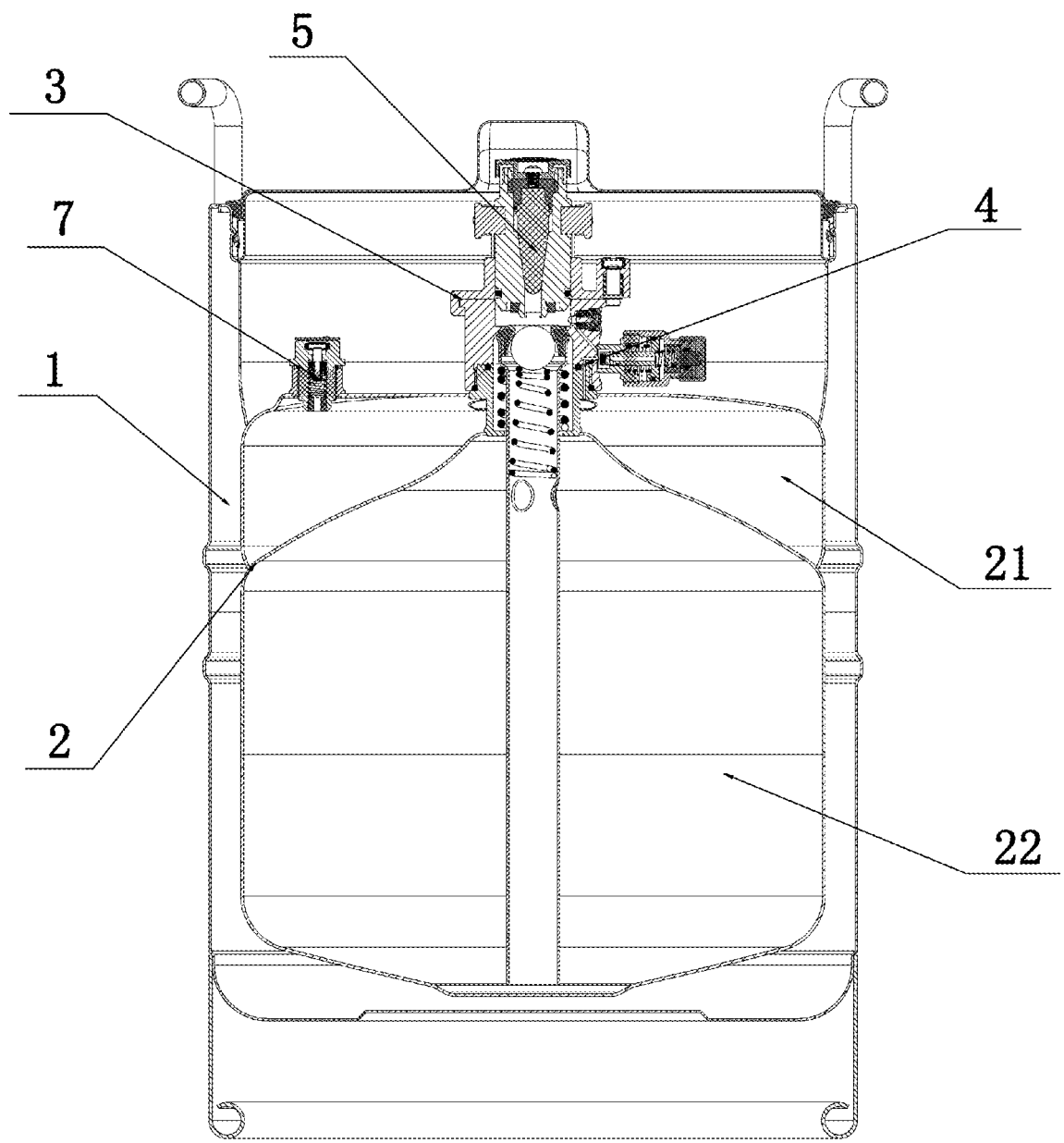
FIG. 2 is a schematic cross-sectional view showing the structure of FIG. 1 taken along line A-A.

FIG. 1 is a schematic cross-sectional view showing the structure of a beverage preservation keg with an adjustable beer tap according to the present invention, and FIG. 2 is a schematic cross-sectional view showing the structure of FIG. 1 taken along line A-A, mainly showing the beverage preservation keg with an adjustable beer tap which is composed of a shell 1, an inner container 2 wrapped by the shell 1, and a gas-liquid control device 3, reflecting the gas-liquid control device 3 which is composed of a keg spear 4 with a pressure relief valve, a dispenser 5 with a beer tap throttle valve, and a beer discharge pipe 6, and the connection relationship therebetween, and also showing a gas storage chamber 21, a beer storage chamber 22 and a gas charging valve 7.

Figure 3:
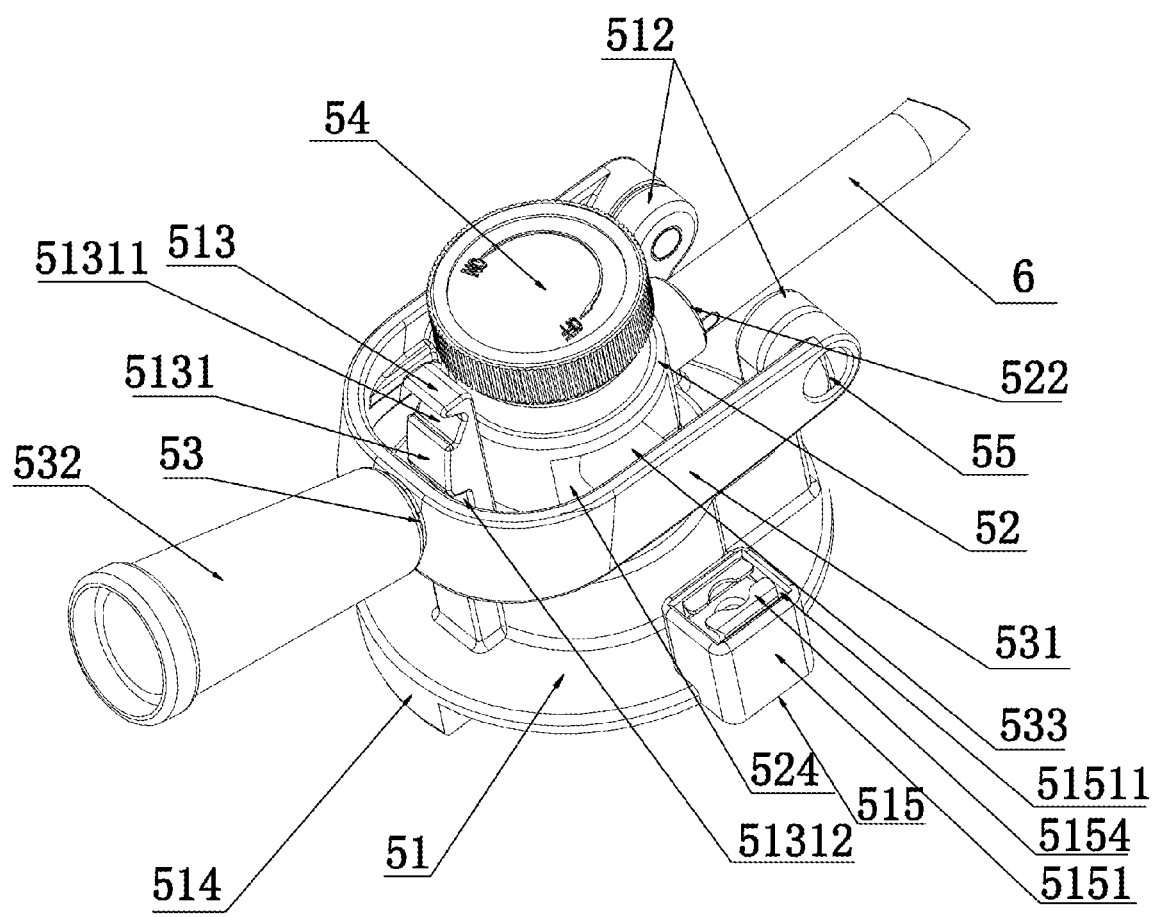
FIG. 3 is a schematic view showing the structure of a dispenser of the present invention in a top view.
Figure 4:
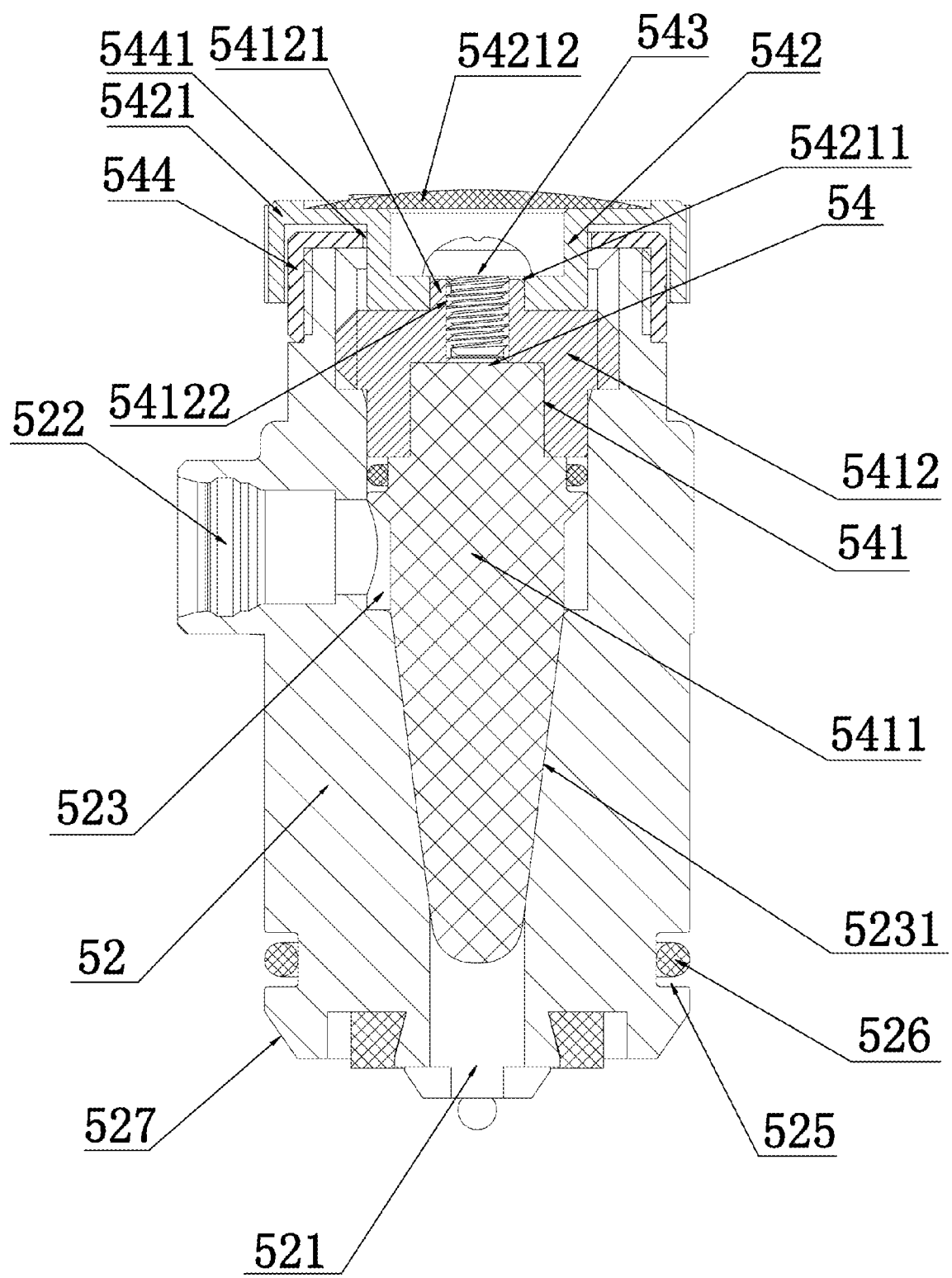
FIG. 4 is a schematic view showing the structure of a beer tap with a throttle valve according to the present invention.
Figure 5:
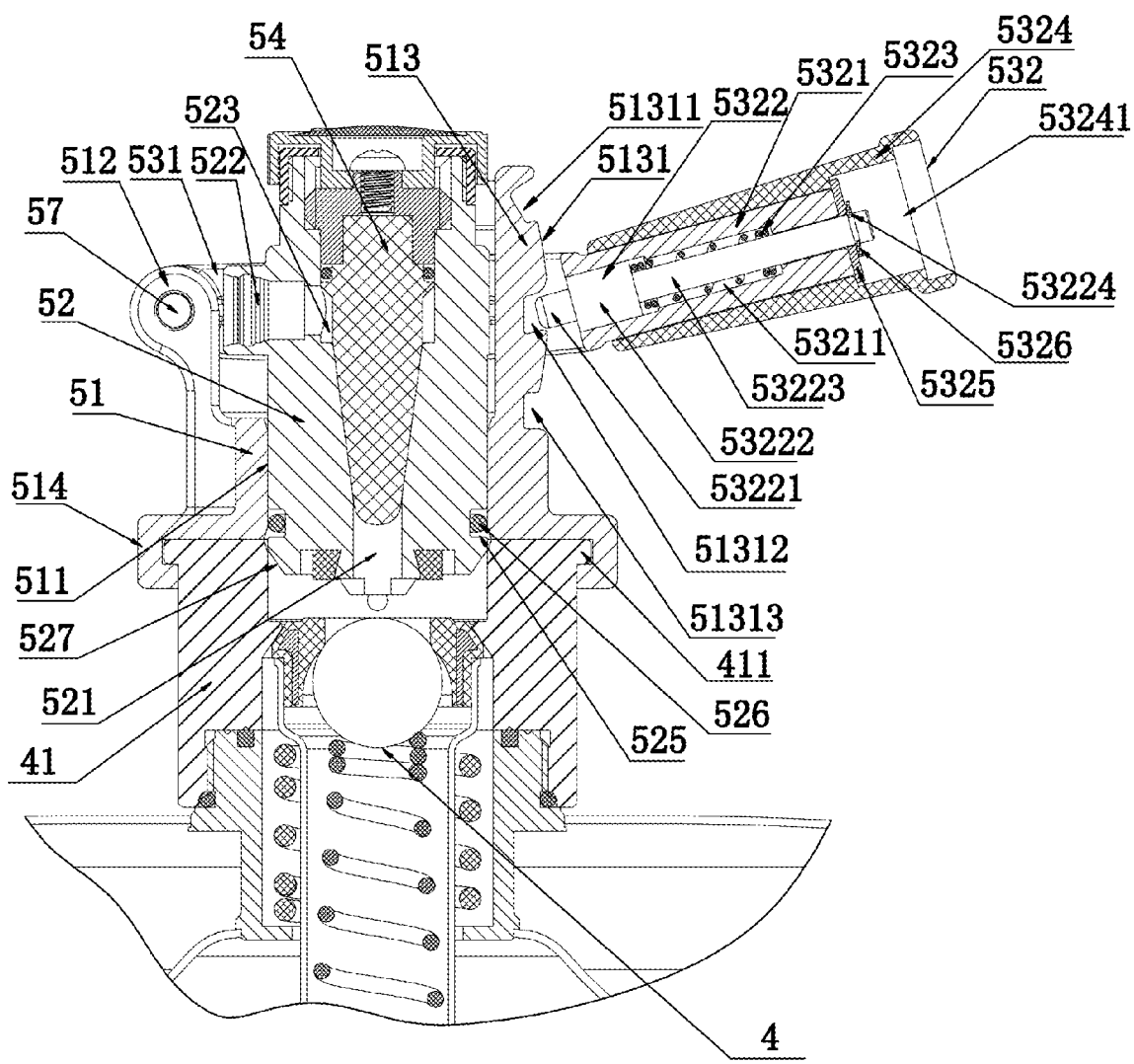
FIG. 5 is a schematic cross-sectional view showing the structure of an operating device on the dispenser connected to the keg spear according to the present invention.
Figure 6:
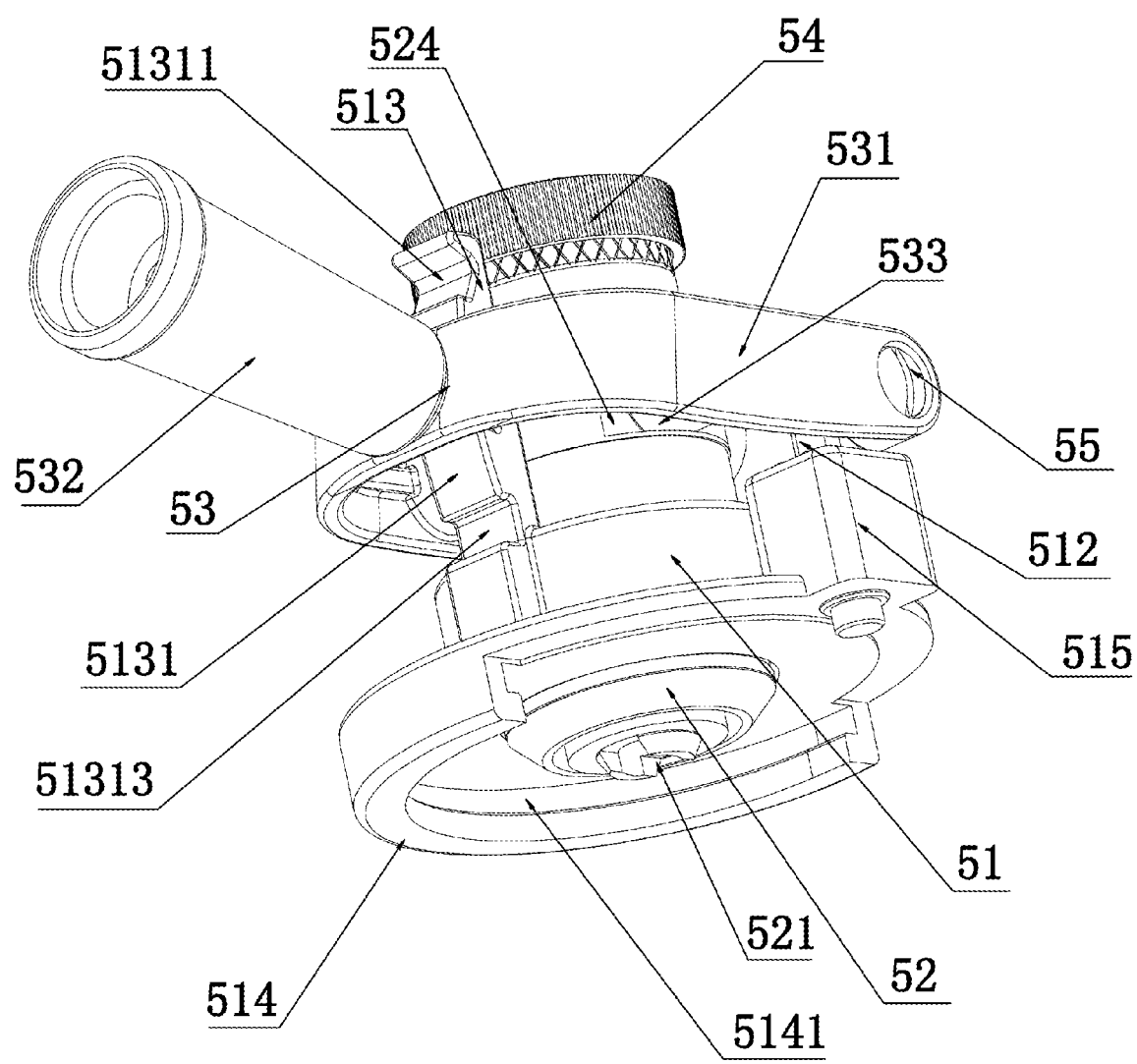
FIG. 6 is a schematic view showing the structure of the dispenser of the present invention in a bottom view.
Figure 7:
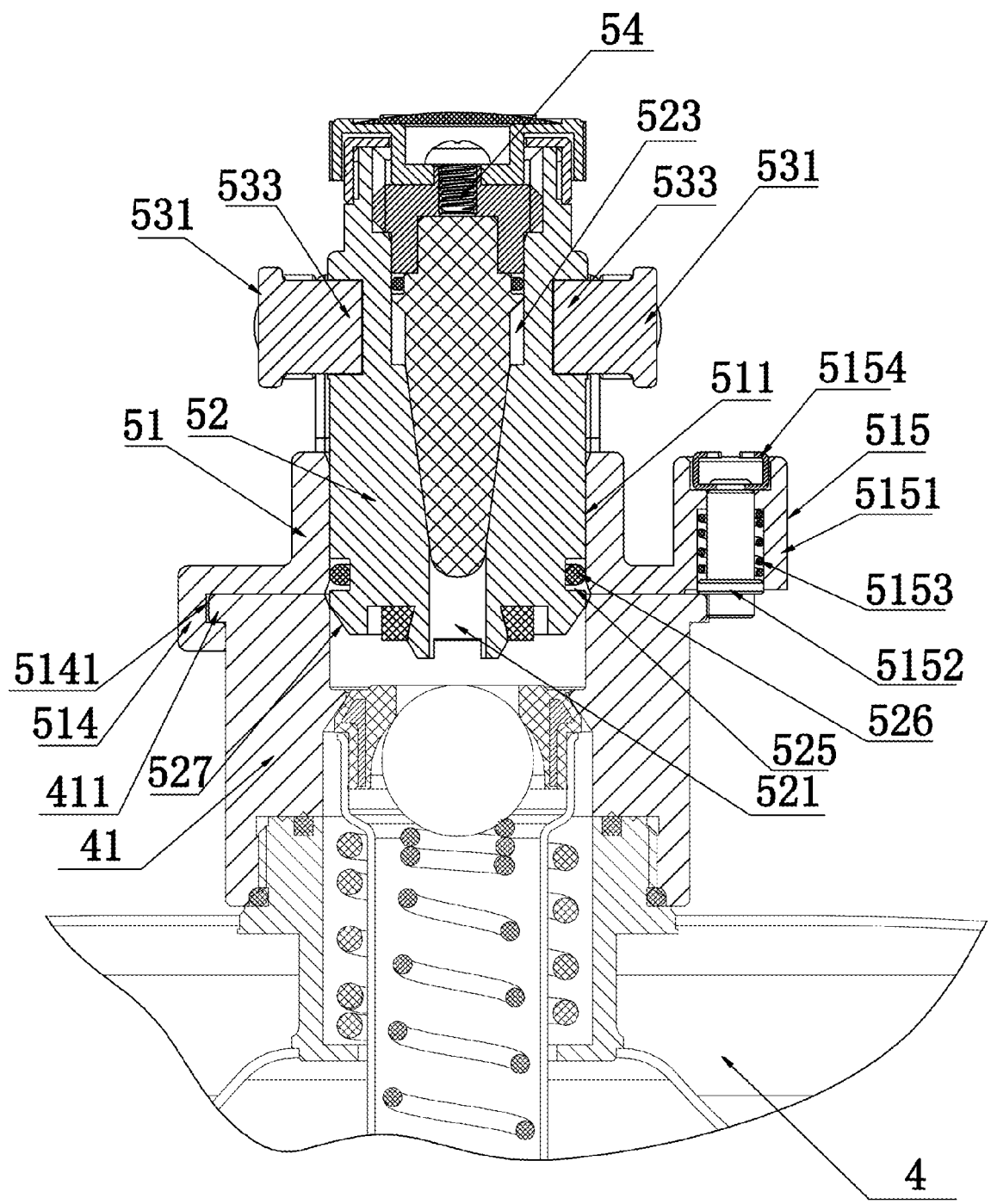
FIG. 7 is a schematic cross-sectional view showing the structure of the connection structure between the dispenser and the keg spear according to the present invention.
Figure 8:
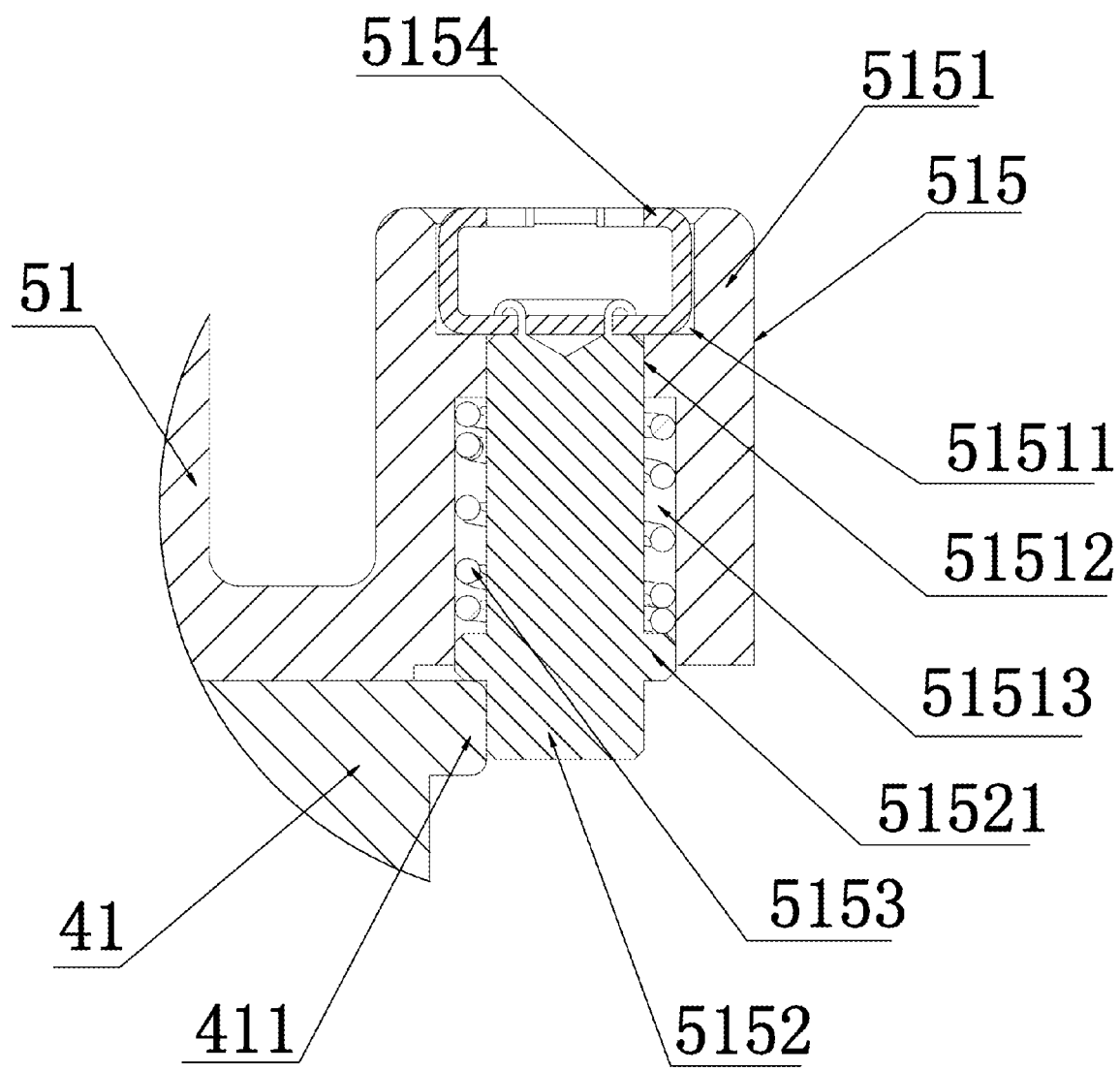
FIG. 8 is a schematic enlarged view showing the structure of a pin assembly of the present invention.

FIG. 3 is a schematic view showing the structure of a dispenser of the present invention in a top view, showing the dispenser which is composed of a dispenser seat 51, a beer tap 52, an operating device 53 and a throttle valve 54, and the connection relationship therebetween. FIG. 4 is a schematic view showing the structure of a beer tap with a throttle valve according to the present invention, mainly reflecting the throttle valve 54 which is composed of a valve body 541, a valve switch 542, a valve body screw 543 and a valve body limiting member 544, and the connection relationship therebetween. FIG. 5 is a schematic cross-sectional view showing the structure of an operating device on the dispenser connected to the keg spear according to the present invention, mainly showing the connection structure between the dispenser seat 51 and the beer tap 52, and reflecting the three-gear control structure of the operating device 53. FIG. 6 is a schematic view showing the structure of the dispenser of the present invention in a bottom view, mainly showing a curved snap-on plate 514 and a pin assembly 515 at the bottom end of the dispenser seat 51. FIG. 7 is a schematic cross-sectional view showing the structure of the connection structure between the dispenser and the keg spear according to the present invention, reflecting that a connection structure in which the dispenser seat 51 can freely rotate by 360 degrees on the keg spear seat 41. FIG. 8 is a schematic enlarged view showing the structure of a pin assembly of the present invention, showing the pin assembly 522 which is composed of a pin seat 5221, a pin 5222, a return spring 5223 and a grip 5224.

Figure 9:
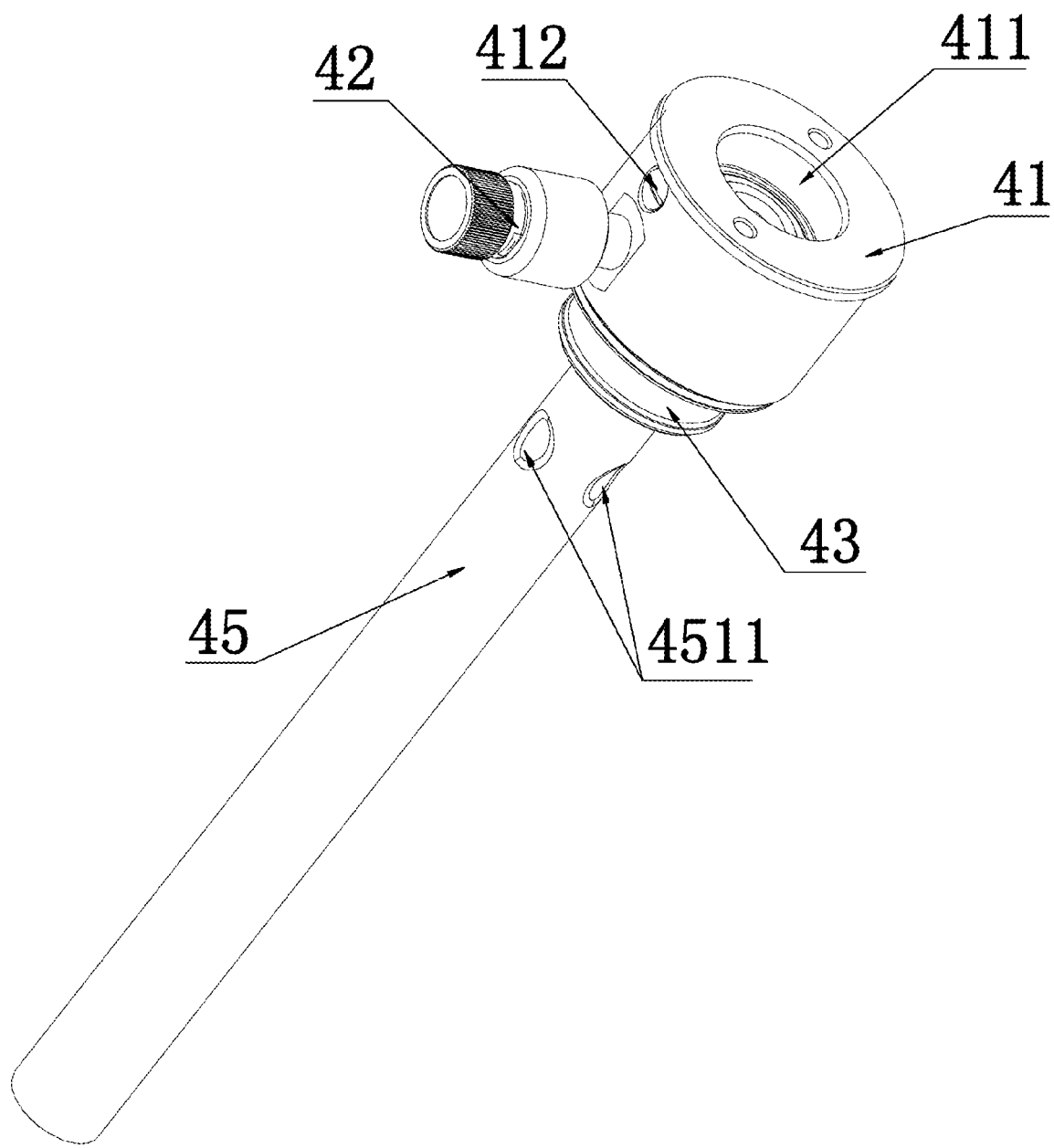
FIG. 9 is a schematic view showing the structure of a keg spear with a pressure relief valve according to the present invention.
Figure 10:
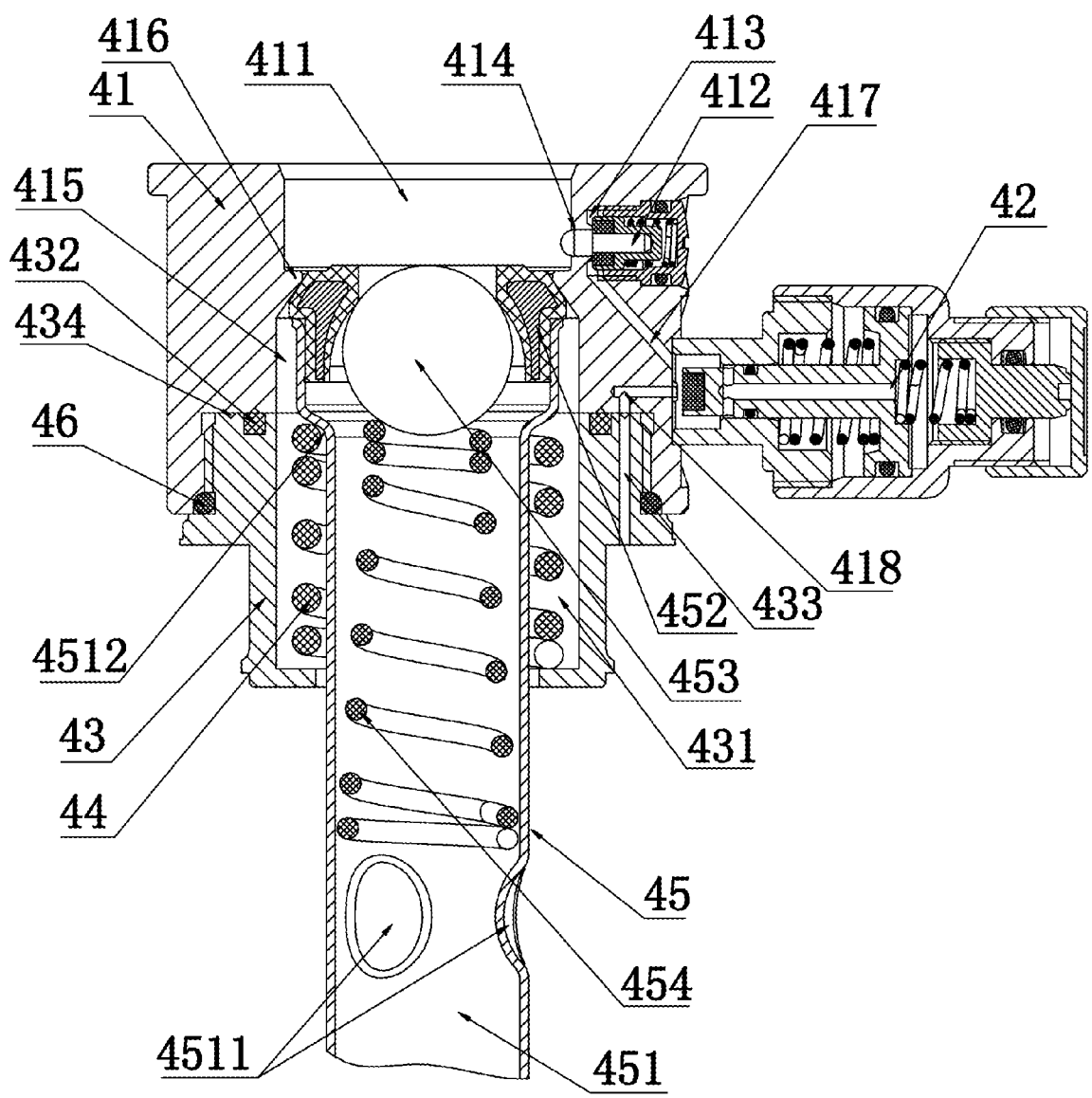
FIG. 10 is a schematic cross-sectional view showing the structure of the keg spear with a pressure relief valve according to the present invention.
Figure 11:
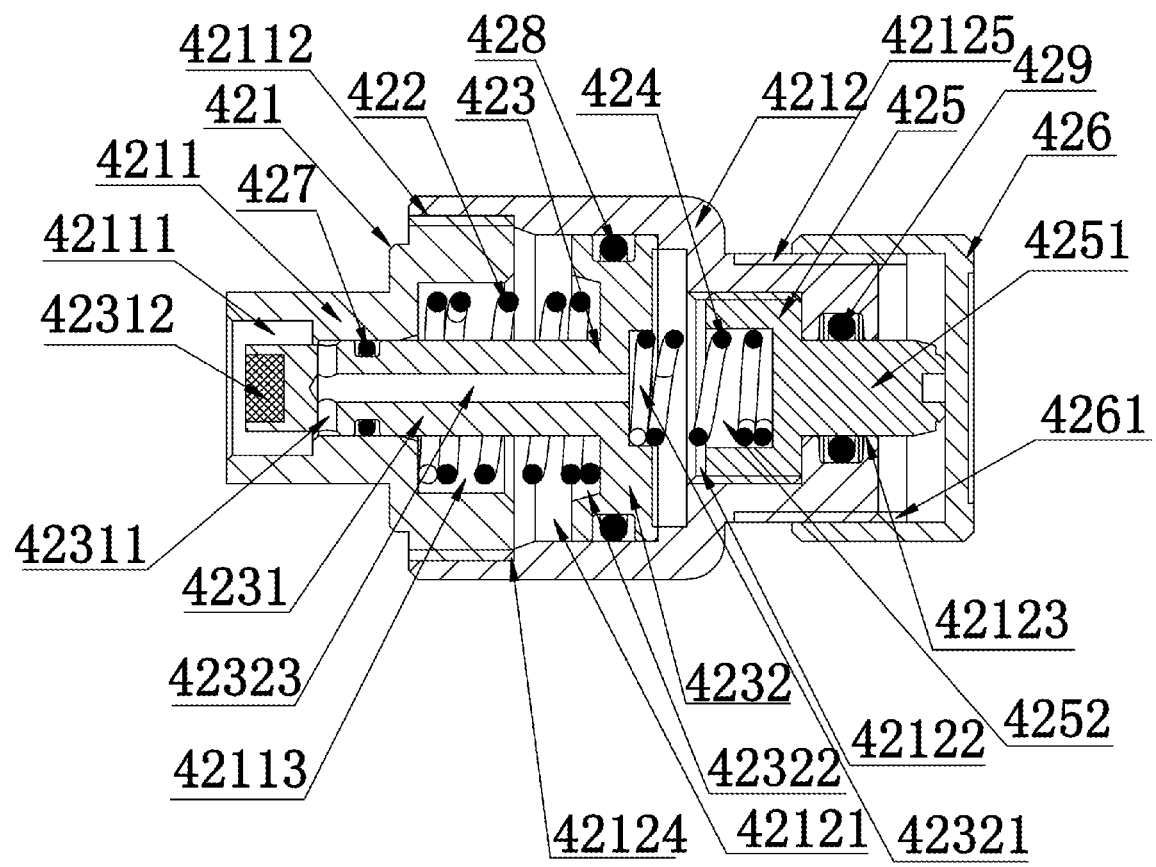
FIG. 11 is a schematic cross-sectional view showing the structure of a pressure relief valve of the present invention.
Figure 12:
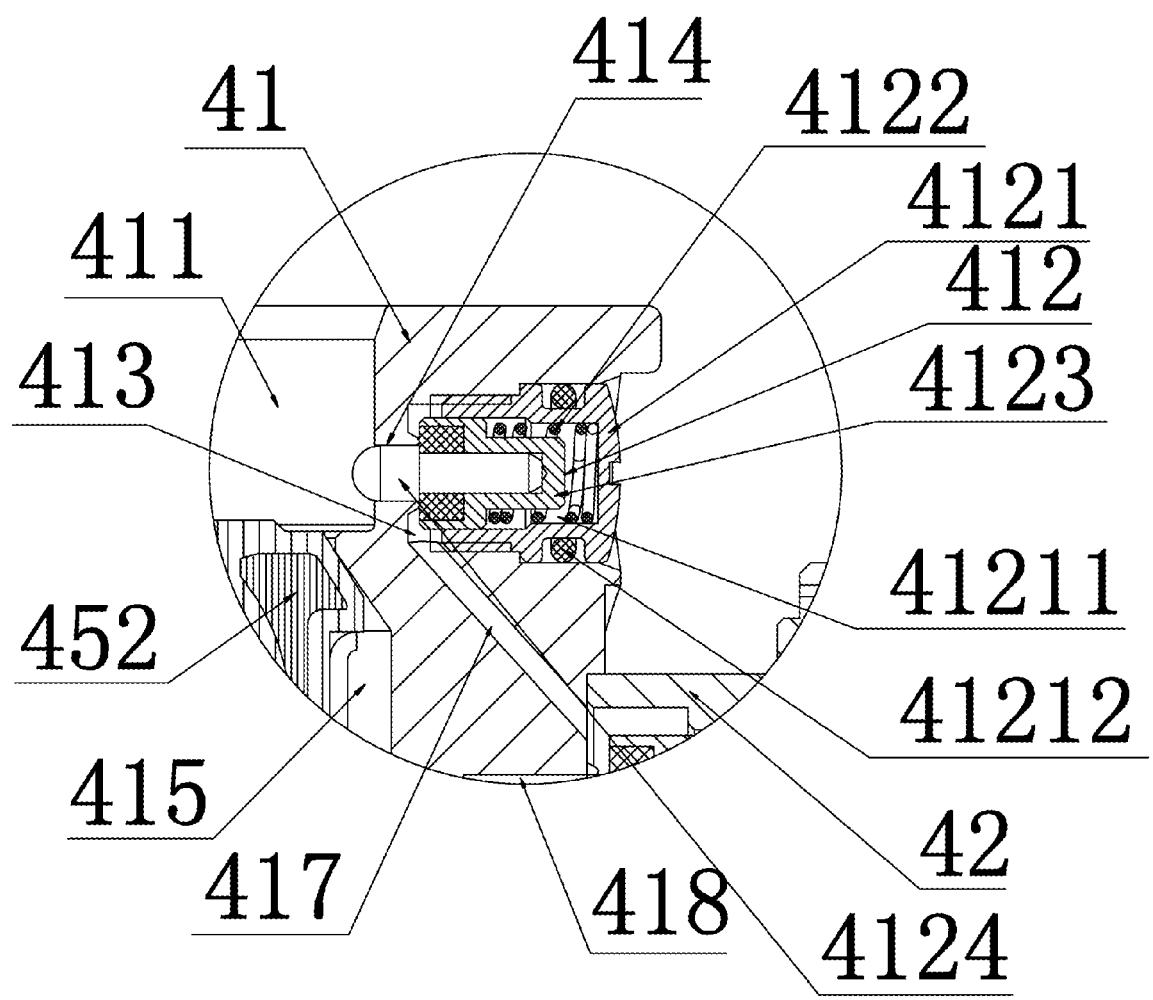
FIG. 12 is a schematic cross-sectional enlarged view showing the structure of a valve device of the present invention.
Figure 13:
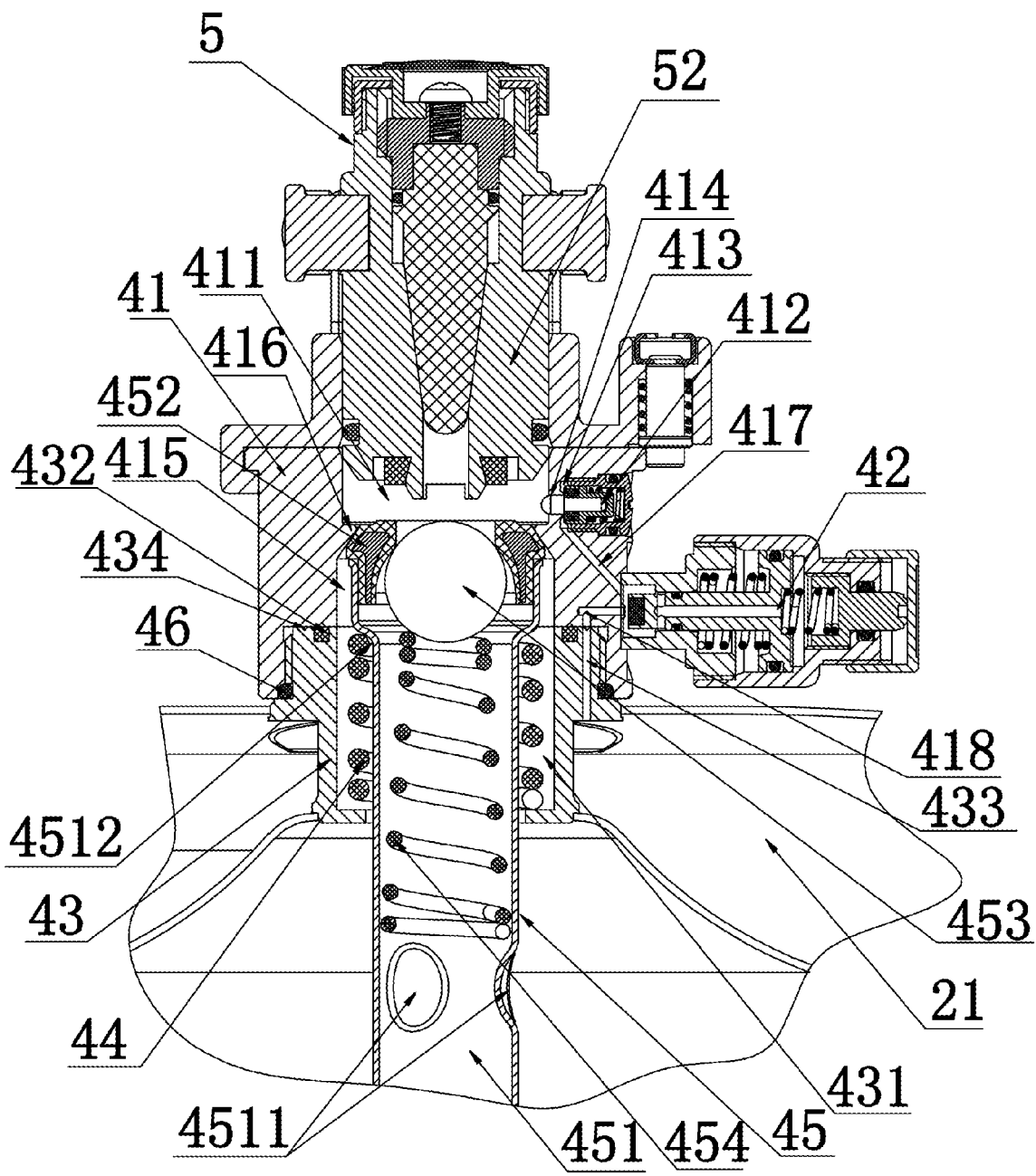
FIG. 13 is a schematic cross-sectional view showing the structure of a keg spear with a dispenser and a gas storage chamber according to the present invention.

FIG. 9 is a schematic view showing the structure of a keg spear with a pressure relief valve according to the present invention, and FIG. 10 is a schematic cross-sectional view showing the structure of the keg spear with a pressure relief valve according to the present invention, showing the keg spear with the pressure relief valve which is composed of a keg spear seat 41, a pressure relief valve 42, an inner tube fixing sleeve 43, an inner tube fixing spring 44 and an inner tube assembly 45, and the connection relationship therebetween. FIG. 11 is a schematic cross-sectional view showing the structure of a pressure relief valve of the present invention, mainly reflecting the pressure relief valve 42 which is composed of a valve body casing 421, a first compression spring 422, a mushroom-shaped first ejector rod 423, a second compression spring 424 and a pressing block 425, and the connection relationship therebetween, and mainly reflecting an adjustment knob 426 matching the pressing block 425. FIG. 12 is a schematic cross-sectional enlarged view showing the structure of a valve device of the present invention, mainly showing the valve device 412 which is composed of a screw 4121, an ejector block return spring 4122, an ejector block 4123 and a second ejector rod 4124. FIG. 13 is a schematic cross-sectional view showing the structure of a keg spear with a dispenser and a gas storage chamber according to the present invention, reflecting the connection relationship between the keg spear 4, the pressure relief valve 42, the dispenser 5 and the gas storage chamber 21.

Figure 14:
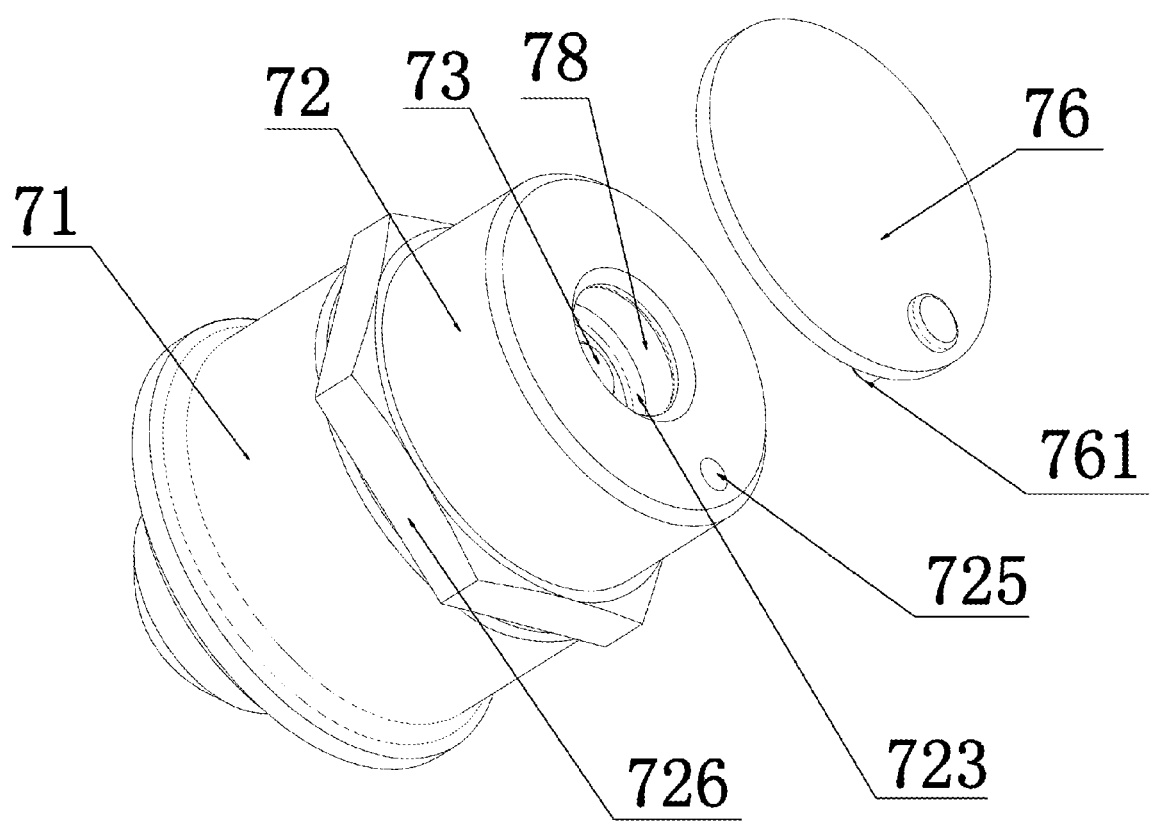
FIG. 14 is a schematic view showing the structure of a gas charging valve of the present invention.
Figure 15:
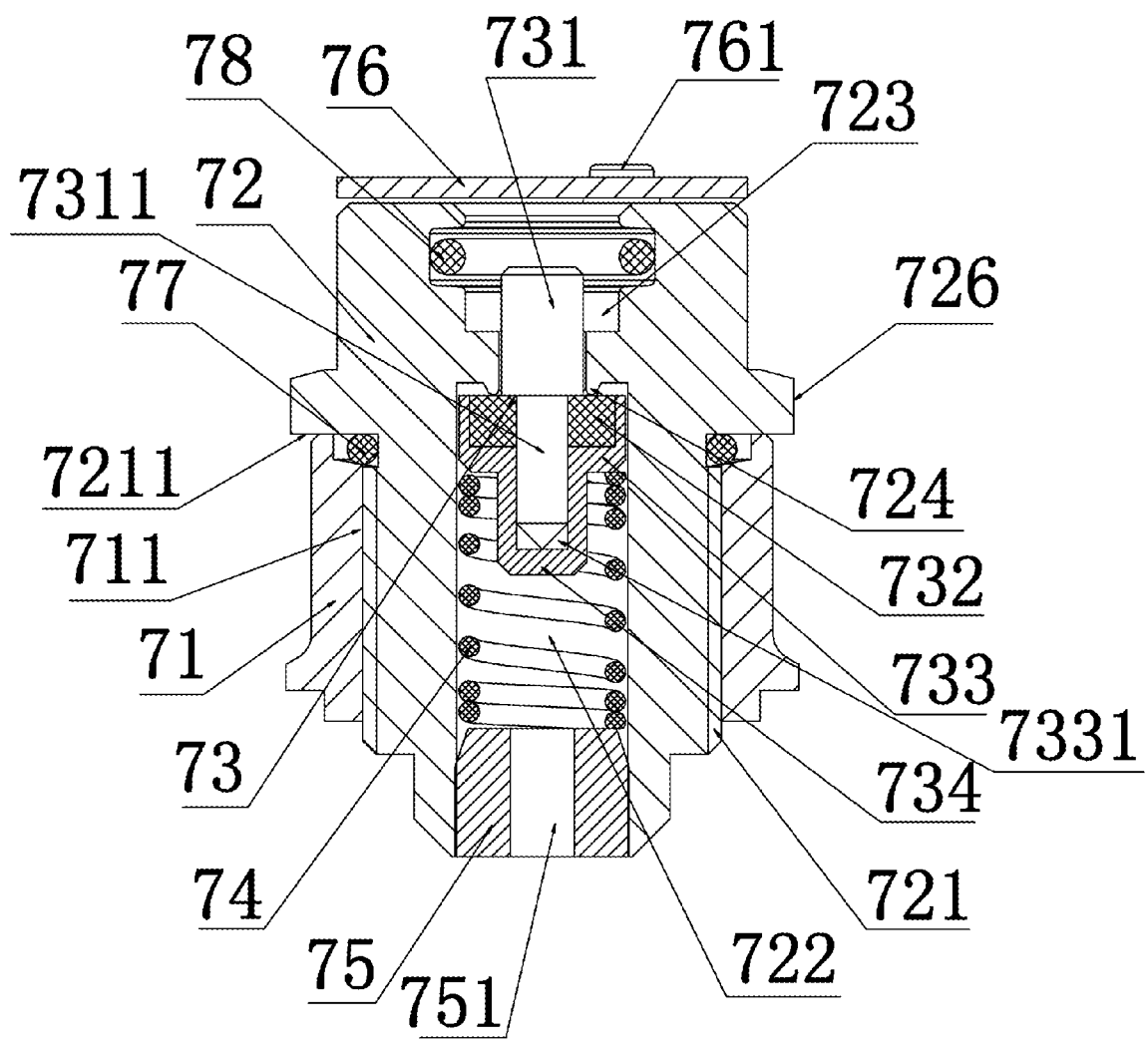
FIG. 15 is a schematic cross-sectional view showing the structure of the gas charging valve of the present invention.

FIG. 14 is a schematic view showing the structure of a gas charging valve of the present invention, and FIG. 15 is a schematic cross-sectional view showing the structure of the gas charging valve of the present invention, mainly showing the gas charging valve which is composed of a gas charging valve connector 71, a gas charging valve body 72, a valve core 73, a valve core return spring 74 and a gas charging valve plug 75, and the connection relationship therebetween, and mainly reflecting a protective cover 76, a first O-ring seal 77 and a second O-ring seal 78.

FIG. 1 is a schematic view showing the structure of a shell of the present invention, showing the shell of a draft beer preservation keg which is composed of a casing 11, a base 12 and a cover plate 13, and the connection relationship therebetween, and reflecting a lifting handle 112 on an annular movable sleeve 114 and the cover plate 13 with an n-shaped handle 132. FIG. 2 is a schematic cross-sectional view showing the structure of the shell of the present invention, mainly showing a base 12 and an annular liner 116 of the socket ring structure and a detachable connection structure with the cover plate 13 and reflecting the connection relationship between the n-shaped handle 132 and the cover plate 13. FIG. 3 is a schematic exploded view showing the structure of the shell of the present invention, which illustrates a structure of the shell for a draft beer preservation keg. FIG. 4 is a schematic view showing the structure of another shell of the present invention, which illustrates another shell for a draft beer preservation keg in which the lifting handle 112 is an n-shaped bent rod 1123, and the cover plate 13 with a linear handle 131. FIG. 5 is a schematic cross-sectional view showing the structure of another shell of the present invention, which illustrates the structural connection relationship of the shell for a draft beer preservation keg in which the lifting handle 112 is an n-shaped bent rod 1123. The structure of the beverage preservation keg with an adjustable beer tap of the present invention is as shown in FIG. 1 and FIG. 2. The beverage preservation keg with an adjustable beer tap includes a shell 1, an inner container 2 enclosed by the shell 1, and a gas-liquid control device 3. The inner container 2 is divided into an upper layer and a lower layer, including an upper gas storage chamber 21 for storing a gas and a lower beer storage chamber 22 for storing a liquid. The gas-liquid control device 3 includes a keg spear 4 with a pressure relief valve, a dispenser 5 with a beer tap throttle valve, and a beer discharge pipe 6. The keg spear 4 matches and communicates with the gas storage chamber 21 and the beer storage chamber 22, and the top end of the keg spear 4 matches and is connected to the dispenser 5. The dispenser 5 matches and is connected to the beer discharge pipe 6.

The keg spear 4 communicates with the gas passage between the gas storage chamber 21 and the beer storage chamber 22. The keg spear 4, the dispenser 5 and the beer discharge pipe 6 communicates with the liquid passage pipe from the beer storage chamber 22 to the outside. The dispenser 5 with the beer tap throttle valve is capable of controlling and adjusting the liquid flow of beer being discharged.

As shown in FIG. 3 and FIG. 6, in this embodiment, the dispenser 5 includes a dispenser seat 51, a beer tap 52, an operating device 53 and a throttle valve 54. The center of the dispenser seat 51 is provided with a beer tap receiving hole 511 which is movably mated with the beer tap 52. The operating device 53 matches and is connected to the dispenser seat 51 and the beer tap 52, respectively. The beer tap 52 is controlled by the operating device 53 to perform a beer tap movement in the beer tap receiving hole 511 of the dispenser seat 51. The throttle valve 54 matches and is mounted in the beer tap 52, and the throttle valve 54 is capable of adjusting the liquid flow inside the beer tap 52. By adopting the above structure, the throttle valve 54 is used for controlling the opening and closing of the liquid inside the beer tap 52, so that the dispenser has the function of controlling the beer discharging flow, which is convenient for the user to adjust the beer discharging flow according to the needs. The inside of the beer tap of the dispenser of the present invention is provided with the throttle valve, so that the device can adjust the beer discharging flow through the dispenser. The structure of the keg spear with the pressure relief valve can eliminate the gas tube and the pressure relief device connected in series between the keg spear and the gas storage chamber, so that the structure and assembly of the beverage preservation keg are simpler and more straightforward, which is economical and practical.

As shown in FIG. 3, FIG. 4 and FIG. 5, in this embodiment, the bottom end of the beer tap 52 is provided with a liquid inlet 521 in fluid communication with the keg spear 4, and the side edge of the beer tap 52 is provided with a liquid outlet 522 matching and being connected to the beer discharge pipe 6. The top end of the beer tap 52 is further provided with a throttle valve mounting hole 523 matching the throttle valve 54, the bottom end of the throttle valve mounting hole 523 matching and communicating with the liquid inlet 521, and the side edge of the throttle valve mounting hole 523 matching and communicating with the liquid outlet 522. The throttle valve 54 includes a valve body 541 matching the throttle valve mounting hole 523, and a valve switch 542 for controlling an up-and-down movement of the valve body 541. When the valve switch 542 controls the valve body 541 to move downward until the valve body 541 is inserted into and sealed by the throttle valve mounting hole 523, the liquid inlet 521 is blocked from communication with the liquid outlet 522 through the throttle valve mounting hole 523, and the beer discharge passage inside the beer tap 52 is closed. When the valve switch 542 controls the valve body 541 to move upward until the valve body 541 and the throttle valve mounting hole 523 are gradually separated to form a gap, the liquid inlet 521 communicates with the liquid outlet 522 through the gap inside the throttle valve mounting hole 523, and the beer discharge passage inside the beer tap 52 is opened. In addition, the liquid flow inside the beer tap 52 can be controlled by the size of the gap between the valve body 541 and the throttle valve mounting hole 523, thereby adjusting and controlling the liquid flow of the beer tap 52 through the valve switch 542.

As shown in FIG. 4, in this embodiment, the valve body 541 includes a lower valve body 5411 having a cone structure with a larger top and a smaller bottom, and an upper valve body 5412 which matches and is coaxially mated and fixed with the top end of the lower valve body 5411. The upper valve body 5411 is made of a stainless-steel material to ensure the rigidity of the valve body 541 in the up-and-down movement, and the lower valve body 5412 is made of a plastic material, which not only ensures a certain hardness but also ensures the sealing performance. The upper valve body 5411 of the metal member is used as an insert, and the lower valve body 5412 encloses the upper valve body 5411 into an integral valve body 541 by resin injection molding. The bottom section of the throttle valve mounting hole 523 is a conical hole 5231 matching the cone structure of the lower valve body 5411. The gap between the lower valve body 5411 and the conical hole 5231 is uniform, and the liquid flows from the minimum annular gap to the maximum annular gap during the beer discharging process, so that the draft beer flows smoothly through the annular gap in a laminar flow state, and the effect of releasing the pressure to reduce the flow rate of the draft beer is achieved, thereby ensuring the smooth discharge of the draft beer, avoiding the rapid vortex, irregularity, and errors during the flow of the draft beer, and also avoiding the situation where the beer flow rate is too high, causing foam splashing. The valve switch 542 is a knob switch 5421, and the middle of the knob switch 5421 is provided with a coaxial, positioning and coupling through hole 54211. The positioning and coupling through hole 54211 is a non-circular through hole, such as a rectangular hole, a square hole, an elliptical hole, an arc hole, or the like, to ensure the linkage between the knob switch 5421 and the valve body 541 during rotation. The top end of the upper valve body 5412 is provided with a coaxial, positioning and mating protrusion 54121 which is integrally connected and matches the positioning and coupling through hole 54211, and the top end of the positioning and mating protrusion 54121 is provided with a coaxial, threaded fixing hole 54122. The height of the positioning and mating protrusion 54121 is less than or equal to the depth of the positioning and coupling through hole 54211, to ensure that there is no upper-and-lower movement gap between the knob switch 5421 and the valve body 541.

The knob switch 5421 is slipped onto the positioning and mating protrusion 54121 through the positioning and coupling through hole 54211, and realizes linkage fixation between the knob switch 5421 and the valve body 541 through the threaded connection between the valve body screw 543 and the threaded fixing hole 54122. The bottom surface of the cap of the valve body screw 543 covers a part of the top surface of the knob switch 5421 to ensure that the connection between the knob switch 5421 and the valve body 541 is fixed. The knob switch 5421 is in a threaded connection with the top end of the beer tap 52, and the knob switch 5421 adjusts the up-and-down movement of the linked valve body 541 inside the throttle valve mounting hole 523 through adjusting the thread connection with the beer tap 52. The dispenser of the present invention realizes the control of the up-and-down movement of the valve body 541 through the knob switch 5421, which is simple in structure and convenient to operate. The top end of the knob switch 5421 is provided with an indicator cover plate 54212 covering the valve body screw 543, and the top surface of the indicator cover plate 54212 is provided with the words for ON and OFF and their corresponding rotating arrows, which protects the valve body screw 543 and provides an intuitive on/off indicating function. In addition, an O-ring is disposed between the valve body 541 and the throttle valve mounting hole 523. The O-ring is disposed above the liquid outlet 522 to ensure sealing performance and prevent the beer from leaking out from the throttle valve mounting hole 523.

As shown in FIG. 4, in this embodiment, the throttle valve 54 further includes a valve body limiting member 544, the middle of the valve body limiting member 544 is provided with a coaxial through hole 5441, and the inner hole diameter of the through hole 5441 is smaller than the maximum outer diameter of the valve body 541. The valve body limiting member 544 is in a detachable and fixed connection with the top of the beer tap 52, such as by a threaded connection, or by a connector structure. The valve body limiting member disposed in the dispenser of the present invention can effectively prevent the valve body 541 from completely disengaging from the throttle valve mounting hole 523 and prevent the beer from flowing out from the throttle valve mounting hole 523. The knob switch 5421 can be connected to the valve body limiting member 544 through a thread, and the up-and-down movement adjustment of the valve body 541 can be achieved by the threaded connection. In addition, the knob switch 5421 can also be connected, through a rotary connector structure, with the valve body limiting member 544 or the top end of the beer tap 54. When the valve body 541 is pressed by the knob switch 5421 and blocks the throttle valve mounting hole 523, the state in which the liquid inlet 521 does not communicate with the liquid outlet 522 is maintained by the rotary connector structure. When the knob switch 5421 is rotated to release from the connected state, the knob body 5421 can be pulled up to drive the valve body 541 to move upward, thereby releasing the sealed blockage between the valve body 541 and the throttle valve mounting hole 523. Thus, the liquid inlet 521 is made to communicate with the liquid outlet 522 through the throttle valve mounting hole 523, thereby achieving beer discharge at the beer tap 52.

As shown in FIG. 3, FIG. 5 and FIG. 6, in this embodiment, the top end of the dispenser seat 51 is provided with two vertically distributed operating support poles 512, and the distances from the two operating support poles 512 to the axial line of the beer tap receiving hole 511 are equal. The operating device 53 includes a U-shaped movable plate 531 and a handle 532. The two top ends of the U-shaped movable plate 531 match and are respectively hinged with the top ends of the two operating support poles 512 through bolts 55, and the middle of the tail end of the U-shaped movable plate 531 matches and is connected to the handle 532. Inner side walls of two side plates of the U-shaped movable plate 531 are provided with symmetrically distributed cylindrical keys 533. Two sides of the top end of the beer tap 52 are provided with symmetrically and horizontally distributed slideways 524, and the width of the slideway 524 matches the cross-sectional diameter of the cylindrical key 533. The dispenser of the present invention utilizes the operating device to drive the beer tap to make an up-and-down movement, thereby controlling the gas passage and the liquid passage in the keg spear.

As shown in FIG. 3 and FIG. 5, in this embodiment, the top surface of the dispenser seat 51 is further provided with a vertically disposed gear plate 513, the gear plate 513 is close to an inner side wall of the tail end of the U-shaped movable plate 531, and the surface of the gear plate 513 close to the inner side wall of the tail end of the U-shaped movable plate 531 is a cambered surface 5131 matching the movement of the U-shaped movable plate 531.

The handle 532 includes a fixed grip 5321, an ejector rod 5322, an ejector rod return spring 5323 and a movable grip 5324. The fixed grip 5321 is integrally connected with the middle of the tail end of the U-shaped movable plate 531, and the inside of the fixed grip 5321 is provided with a first counterbore 53211 which is a through hole. The larger bore opening of the first counterbore 53211 runs through the middle of the tail end of the U-shaped movable plate 531. The ejector rod 5322 includes an ejector head 53221, a larger cylindrical section 53222 matching and mated with the larger bore diameter of the first counterbore 53211, and a smaller cylindrical section 53223 matching and mated with a smaller bore diameter of the first counterbore 53211, which are coaxially and integrally connected in sequence, and the tail end of the smaller cylindrical section 53223 is provided with a circlip groove 53224. After running through the first counterbore 53211, the ejector rod 5322 fixes the circlip groove 53224 to the tail end of the fixed grip 5321 through a gasket 5325 and a circlip 5326, and the outer diameter of the gasket 5325 is larger than the outer diameter of the fixed grip 5321. The circlip groove 53224 can be replaced by a threaded section while the circlip 5326 is replaced by a nut, and after running through the first counterbore 53211, the ejector rod 5322 fixes the threaded section to the tail end of the fixed grip 5321 through the gasket 5325 and the nut. The ejector rod return spring 5323 is disposed between the larger bore bottom end of the first counterbore 53211 and the larger cylindrical section 53222 and matches and is slipped onto the smaller cylindrical section 53223. The inside of the movable grip 5324 is provided with a second counterbore 53241 which is a through hole, the smaller bore diameter of the second counterbore 53241 matches and is mated with the outer diameter of the fixed grip 5321, and the larger bore diameter of the second counterbore 53241 matches and is mated with the outer diameter of the gasket 5325.

The cambered surface 5131 is provided with a first gear slot 51311, a second gear slot 51312 and a third gear slot 51313 which match the ejector head 53221 in sequence from top to bottom.

To use the operating device 53 of the dispenser, hold the movable grip 5324 by a hand and pull it rearward, so that the gasket 5325 abuts against the bottom end of the larger bore of the second counterbore 53241, thereby driving the ejector rod 5322 to also move rearward against the spring force of the ejector rod return spring 5323, and thus, the ejector head 53221 of the ejector rod 5322 retracts into the first counterbore 53211. Then, control the handle 532 to move up and down to drive the beer tap 52 to make an up-and-down movement. When the front end of the handle 532 is aligned with any one of the gear slots on the cambered surface 5131 of the gear plate 513, release the handle, so that the ejector head 53221 of the ejector rod 5322 engages the aligned gear slot under the action of the return spring force of the ejector rod return spring 5323, thereby fixing the operating device in this position. Wherein, when the ejector head 53221 engages the first gear slot 51311, which belongs to the neutral gear, the beer tap 52 does not open the gas passage and the liquid passage, and the draft beer preservation keg is kept in the storage state. When the ejector head 53221 engages the second gear slot 51312, the beer tap 52 opens the gas passage but does not open the liquid passage, and the carbon dioxide gas in the draft beer preservation keg enters the keg spear seat 41. When the ejector head 53221 engages the third gear slot 51313, the beer tap 52 simultaneously opens the gas passage and the liquid passage, so that the carbon dioxide gas enters the beer storage chamber of the keg spear 4, thereby driving the draft beer to flow through the keg spear seat 41 into the liquid inlet 521 of the beer tap and then flow into the beer discharge pipe 6 from the liquid outlet 522.

As shown in FIG. 5, in this embodiment, the outer side of the bottom end of the beer tap 52 is provided with a coaxial O-ring mounting groove 525, and the inside of the O-ring mounting groove 525 is provided with a matching O-ring 526. The O-ring in the present invention can effectively seal the outlet of the keg spear seat 41 at the top end of the keg spear 4 and prevent gas from leaking out from the beer tap into the outlet at the top end of the keg spear seat 41, thereby improving the gas sealing performance.

As shown in FIG. 5, in this embodiment, the outer ring at the bottom end of the beer tap 52 is provided with a chamfer 527, which guides the beer tap to smoothly enter the outlet at the top end of the keg spear seat 41, thereby ensuring smooth up-and-down movement of the beer tap.

As shown in FIG. 5, in this embodiment, the liquid inlet 521 is vertically disposed and is coaxial with the beer tap 52. The liquid outlet 522 is provided on the side surface of the top section of the beer tap 52 and disposed between two parallelly distributed operating support poles 512. The liquid outlet 522 and the liquid inlet 521 intersect perpendicularly in the beer tap 52 so that the draft beer in the keg spear enters from the liquid inlet of the beer tap and flows out from the liquid outlet under the pressure of carbon dioxide gas.

As shown in FIG. 9 and FIG. 13, in this embodiment, the keg spear 4 includes a keg spear seat 41, a pressure relief valve 42, an inner tube fixing sleeve 43, an inner tube fixing spring 44 and an inner tube assembly 45. The pressure relief valve 42 is disposed at an appropriate location on the outer side surface of the keg spear seat 41, and a pressure inlet of the pressure relief valve 42 matches and communicates with the gas storage chamber 21. The top end of the keg spear seat 41 is provided with a beer tap movable hole 411 matching the beer tap 52 of the dispenser 5, the side surface of the beer tap movable hole 411 is provided with a valve device 412 that is linked to and matches the beer tap 52, and the valve device 412 respectively communicates with a stable pressure outlet of the pressure relief valve 42 and the beer tap movable hole 411. The keg spear of the present invention adopts the above structure, so the pressure relief valve can directly communicate with the beer storage chamber and the gas storage chamber, thereby eliminating the transitional connection of the gas pipe so that the draft beer keg is more convenient to disassemble and assemble, saving the space of the beer keg, and also avoiding problems such as gas leakage caused by gas tube damage and spoiling of draft beer. The valve device 412 is disposed such that the opening and closing of the valve device 412 can be controlled through the up-and-down movement of the beer tap of the dispenser.

As shown in FIG. 10 and FIG. 11, in this embodiment, the pressure relief valve 42 includes a valve body casing 421, a first compression spring 422, a mushroom-shaped first ejector rod 423, a second compression spring 424 and a pressing block 425. The first compression spring 422, the first ejector rod 423, the second compression spring 424 and the pressing block 425 are coaxially distributed in sequence from left to right in the valve body casing 421. The first ejector rod 423 includes a telescopic rod 4231 and a mushroom head 4232 which are coaxially and integrally connected. The first compression spring 422 matches and is slipped onto the telescopic rod 4231 of the first ejector rod 423, and the two ends of the first compression spring 422 are forced between the bottom of the mushroom head 4232 and the valve body casing 421. The two ends of the second compression spring 424 are forced between the top of the mushroom head 4232 and the pressing block 425. The pressing block 425 is axially pressed to act on the second compression spring 424, and the spring resetting force of the first compression spring 422 is overcome by the spring force of the second compression spring 424 to change the axial pressure of the first ejector rod 423, that is, the pressing block 425 is pressed to achieve the pressure adjustment of the top end of the telescopic rod 4231. The keg spear of the present invention adopts the above structure, so the pressing block can be used to adjust the interaction force between the two compression springs, thereby adjusting the pressure of the top end of the ejector rod, and further achieving the function of adjustable limiting pressure of the pressure relief valve.

In this embodiment, the valve body casing 421 includes a front casing 4211 and a rear casing 4212. The front end of the front casing 4211 is provided with a third counterbore 42111 which is a through hole, and the smaller bore diameter of the third counterbore 42111 matches the outer diameter of the telescopic rod 4231. The rear casing 4212 is provided with a mushroom head receiving hole 42121, a pressing block receiving hole 42122 and a pressing hole 42123 which are in coaxial communication in sequence from front to rear, the bore diameter of the mushroom head receiving hole 42121 matches the outer diameter of the mushroom head 4232, the bore diameter of the pressing block receiving hole 42122 matches the outer diameter of the pressing block 425, and the bore diameter of the pressing hole 42123 is smaller than the diameter of the pressing block receiving hole 42122. The outer side of the rear end of the front casing 4211 is provided with a first threaded section 42112 coaxial with the third counterbore 42111, and the front end of the mushroom head receiving hole 42121 is provided with a first threaded hole 42124 matching the first threaded section 42112. The front casing 4211 and the rear casing 4212 achieve a fixed connection through the matching threaded connection between the first threaded section 42112 and the first threaded hole 42124. The mushroom head 4232 of the first ejector rod 423 matches and is inserted into the mushroom head receiving hole 42121, and the telescopic rod 4231 of the first ejector rod 423 matches and is inserted into the smaller bore of the third counterbore 42111. The first compression spring 422 matches and is slipped onto the telescopic rod 4231 and disposed between the rear end surface of the front casing 4211 and the bottom of the mushroom head 4232. The pressing block 425 is matches and is inserted into the pressing block receiving hole 42122. The second compression spring 424 is disposed between the top of the mushroom head 4232 and the pressing block 425. The pressure inlet of the pressure relief valve 42 is a larger bore opening end of the third counterbore 42111 axially covered by the top end of the telescopic rod 4231, and the stable pressure outlet of the pressure relief valve 42 is a larger bore opening end of the third counterbore 42111 that is not axially covered by the top end of the telescopic rod 4231. A sealing ring may be disposed between the first threaded section 42112 and the first threaded hole 42124, or a thread locker is applied between the first threaded section 42112 and the first threaded hole 42124 to ensure the sealing performance of the device. In addition, when there is no sealing between the first threaded section 42112 and the first threaded hole 42124, the pressure in the space where the first compression spring 422 is located can always be kept consistent with the outside, thereby making it easier to calculate the spring force of the first compression spring 422.

As shown in FIG. 11, in this embodiment, the rear end of the pressing block 425 is further provided with a coaxial ejector column 4251, and the outer diameter of the ejector column 4251 matches the bore diameter of the pressing hole 42123, and the ejector column 4251 protrudes from the rear end of the rear casing 4212. The keg spear with the pressure relief valve further includes an adjustment knob 426, and the front end of the adjustment knob 426 is provided with a second threaded hole 4261 which is not a through hole. The outer side of the rear end of the rear casing 4212 is provided with a second threaded section 42125 matching the second threaded hole 4261. The adjustment knob 426 achieves a fixed connection with the rear end of the rear casing 4212 through the matching threaded connection between the second threaded hole 4261 and the second threaded section 42125, and the hole bottom of the second threaded hole 4261 abuts against the tail end of the ejector column 4251. The keg spear of the present invention adopts the above structure, so the adjustment knob 426 can be used to adjust the axial displacement of the pressing block 425 and adjust the difference of interaction force between the first compression spring 422 and the second compression spring 424, thereby adjusting the pressure of the top end of the first ejector rod 423, and further achieving the function of adjustable pressure of the device. Moreover, a matching pressure scale can also be disposed on the adjustment knob 426, and the pressure scale can indicate the pressed applied to the top end of the first ejector rod 423. In the case of no adjustment knob 426, the ejector column 4251 and the pressing hole 42123 are directly connected through a thread, thereby achieving the pressure adjustment of the pressure relief valve through the thread adjustment of the ejector column 4251. In addition, a structure in which the ejector column 4251 and the pressing block 425 are integrally connected may be adopted, and a split structure may also be employed.

As shown in FIG. 11, in this embodiment, the top of the mushroom head 4232 is provided with a coaxial first compression spring receiving hole 42321 that matches the second compression spring 424, the front end of the pressing block 425 is provided with a coaxial second compression spring receiving hole 4252 that matches the second compression spring 424, and the two ends of the second compression spring 424 are respectively inserted into the first compression spring receiving hole 42321 and the second compression spring receiving hole 4252. The keg spear of the present invention adopts the above structure, so the offset of the second compression spring 424 can be effectively limited, thereby ensuring the stability of the spring force of the second compression spring 424.

As shown in FIG. 11, in this embodiment, the rear end surface of the front casing 4211 is provided with a third compression spring receiving hole 42113 which coaxially communicates with the third counterbore 42111 and matches the first compression spring 422, the bottom of the mushroom head 4232 is provided with a coaxial, annular compression spring receiving hole 42322 matching the first compression spring 422, and the two ends of the first compression spring are respectively inserted into the third compression spring receiving hole 42113 and the annular compression spring receiving hole 42322. By adopting the above structure, the keg spear of the present invention can prevent the offset of the first compression spring 422 to ensure the stability of the first compression spring 422 and can make the structure of the pressure relief valve more compact, thereby saving space, and minimizing the size while ensuring the performance of the pressure relief valve.

As shown in FIG. 11, in this embodiment, a first O-ring 427 is disposed between the smaller bore of the third counterbore 42111 and the telescopic rod 4231. A second O-ring 428 is disposed between the mushroom head receiving hole 42121 and the mushroom head 4232. A third O-ring 429 is disposed between the pressing hole 42123 and the ejector column 4251. The above O-ring in the present invention can effectively ensure the sealing performance inside the pressure relief valve.

As shown in FIG. 11, in this embodiment, the side edge of the top end of the telescopic rod 4231 is provided with a radial side hole 42311, and the side hole 42311 communicates with the larger bore of the third counterbore 42111, and the side hole 42311 is disposed at the front end of the first O-ring 427. The top of the mushroom head 4232 of the first ejector rod 423 is provided with a vent hole 42323 communicating with the side hole 42311. The keg spear of the present invention is provided with the side hole 42311 and the vent hole 42323 described above, so that the communication of the larger bore of the third counterbore 42111 with the space at the second compression spring 424 can be maintained to ensure the pressures at the two positions are stable and identical, that is, to ensure the pressure at the stable pressure outlet to be always consistent with the pressure at the second compression spring 424, thereby achieving the stable pressure at the stable pressure outlet of the device. For example, the pressure of the top end of the first ejector rod 423 is adjusted to x, the pressure of the pressure inlet at the top end of the first ejector rod 423 is F, and the pressure of the stable pressure outlet disposed at the larger bore of the third counterbore 42111 and the pressure at the second compression spring 424 are both y. When F>x+y, the top end of the first ejector rod 423 is ejected away by the pressure inlet, and at this time, the pressure of the stable pressure outlet disposed at the larger bore of the third counterbore 42111 and the pressure of the second compression spring 424 are both greater than y, and reach a stable pressure value until F−x. When the pressure at the second compression spring 424 is greater than F−x, that is, when the pressure at the second compression spring 424 plus the pressure of the top end of the first ejector rod 423 is greater than F, the top end of the first ejector rod 423 blocks the pressure inlet, thereby ensuring the pressure at the stable pressure outlet disposed at the larger bore of the third counterbore 42111 to be always kept at the value of F−x, and further achieving the function of stable pressure output of the pressure relief valve. In addition, when F<x+y, the first ejector rod 423 always blocks the pressure inlet, which can effectively avoid the situation of pressure backflow.

As shown in FIG. 11, in this embodiment, the top end of the telescopic rod 4231 of the first ejector rod 423 is provided with a rubber block 42312 that matches and is connected to the top end, thereby improving the sealing performance between the top end of the first ejector rod 423 and the pressure inlet.

As shown in FIG. 12, in this embodiment, the valve device 412 includes a screw 4121, an ejector block return spring 4122, an ejector block 4123 and a second ejector rod 4124. The outer side surface of the top end of the keg spear seat 41 is provided with a threaded hole 413 matching the screw 4121, the tail end of the threaded hole 413 is provided with a gas hole 414 communicating with the beer tap movable hole 411, and the gas hole 414 matches and receives the second ejector rod 4124. The tail end of the second ejector rod 4124 matches and is connected to the ejector block 4123. The tail end of the screw 4121 is provided with a receiving hole 41211 matching the ejector block 4123, and the ejector block return spring 4122 is disposed between the ejector block 4123 and the bottom end of the receiving hole 41211. The outer side surface of the screw 4121 is provided with a fourth O-ring 41212 matching the threaded hole 413. The stable pressure outlet of the pressure relief valve 42 matches and communicates with the threaded hole 413. Since the keg spear of the present invention adopts the valve device in the above structure, as long as the beer tap 52 ejects the second ejector rod 4124 away against the spring force of the ejector block return spring 4122 during the movement, carbon dioxide gas can be guided into the beer tap movable hole 411 of the keg spear seat. When the second ejector rod 4124 is ejected away by the beer tap 52, the carbon dioxide gas flows into the pressure relief valve 42 from the gas storage chamber 21, then into the screw hole 413 through the stable pressure outlet of the pressure relief valve 42, and finally into the beer tap movable hole 411 of the keg spear seat 41 through the gas hole 414. When the beer tap 52 moves upward to reset, the ejector block 4123 and the second ejector rod 4124 are pushed to reset under the spring force of the ejector block return spring 4122, so that the ejector block 4123 blocks the gas hole 414 to prevent the carbon dioxide gas from entering the beer tap movable hole 411.

As shown in FIG. 10, in this embodiment, the bottom end of the keg spear seat 41 is provided with a fourth counterbore 415 communicating with the beer tap movable hole 411, and the inner wall of the larger bore of the fourth counterbore 415 is fixedly connected to the outer wall of the inner tube fixing sleeve 43 through a thread.

The inner tube assembly 45 includes an inner tube 451, an intake sealing ring 452, a plug 453 and a plug return spring 454. The intake sealing ring 452 is disposed at the top end of the inner tube 451. The middle portion of the inner tube 451 is provided with a plurality of inner bosses 4511 uniformly distributed in a circular array with its axial line as an axis. The plug return spring 454 is disposed between the inner bosses 4511 and the plug 453, and the plug 453 is pressed upward against and sealed with the inner ring of the intake sealing ring 452 under the action of the spring force of the plug return spring 454. The top surface of the inner tube fixing sleeve 43 is provided with a fifth counterbore 431 running through the bottom surface, and the smaller bore of the fifth counterbore 431 and the inner tube 451 are mated in a clearance fit. The outer side surface of the inner tube 451 near the top end is provided with a step surface 4512 projecting outward, and the inner tube fixing spring 44 is disposed between the bottom surface of the larger bore of the fifth counterbore 431 and the step surface 4512 and matches and is slipped onto the inner tube 451. The plug 453 may be a steel ball.

A portion of the fourth counterbore 415 in communication with the beer tap movable hole 411 is provided with an annular protrusion 416. The outer ring of the intake sealing ring 452 is pressed upward against and sealed with the annular protrusion 416 under the action of the spring force of the inner tube fixing spring 44.

When the product is in operation, the beer tap 52 of the dispenser 5 moves into the beer tap movable hole 411 of the keg spear seat 41. Firstly, the side surface of the beer tap 52 opens the valve device 412, so that the carbon dioxide gas flows into the pressure relief valve 42 from the gas storage chamber 21, then into the valve device 412 through the stable pressure outlet of the pressure relief valve 42, and then into the beer tap movable hole 411 through the valve device 412. Secondly, the bottom end of the beer tap ejects the plug 453 away against the spring force of the plug return spring 454, so that the plug 453 is separated from the intake sealing ring 452 to connect the pipes in the beer storage chamber 22, the inner tube 451 and the beer tap 52, thereby forming a connected liquid passage capable of discharging beer. At the same time, the bottom surface of the beer tap 52 abuts against the top surface of the intake sealing ring 452 to prevent gas from entering the communication liquid passage. Finally, during the downward movement, the beer tap 52 opens the seal between the intake sealing ring 452 and the annular protrusion 416 against the spring force of the inner tube fixing spring 44, so that the carbon dioxide gas can flow into the fifth counterbore 431 through the fourth counterbore 415, and then into the top end of the beer storage chamber 22. Therefore, the gas passage is opened, so that the draft beer is forced under the gas pressure to be discharged from the inner tube 451 through the connected liquid passage.

As shown in FIG. 10 and FIG. 12, in this embodiment, the inside of the keg spear seat 41 is provided with a first hole 417 communicating with the stable pressure outlet of the pressure relief valve 42 and the valve device 412, so that the valve device 412 can directly communicate with the stable pressure outlet of the pressure relief valve 42. The top end of the inner tube fixing sleeve 43 is provided with a second hole 433 communicating with the gas storage chamber 21, and the top end of the inner tube fixing sleeve 43 is further provided with a coaxial, annular groove 434 communicating with the second hole 433. The bottom surface of the larger bore of the fourth counterbore 415 is provided with a third hole 418 communicating with the pressure inlet of the pressure relief valve 42, and the distance of the third hole 418 from the opening end of the bottom surface of the larger bore of the fourth counterbore 415 to the axial line of the fourth counterbore 415 is equal to the radius of the annular groove 434. The keg spear of the present invention is provided with the above annular groove 434 to facilitate the communication between the second hole 433 and the third hole 418.

As shown in FIG. 10, in this embodiment, a sealing gasket 432 is disposed between the top surface of the inner tube fixing sleeve 43 and the bottom surface of the larger bore of the fourth counterbore 415, and the bore diameter of the sealing gasket 432 is smaller than the bore diameter of the annular groove 434, thereby effectively preventing the gas storage chamber 21 from communicating with the beer storage chamber. A threaded connection portion between the inner wall of the larger bore of the fourth counterbore 415 and the outer wall of the inner tube fixing sleeve 43 is provided with a fifth O-ring 46, thereby effectively preventing the gas in the gas storage chamber 21 from leaking out from the threaded connection portion. The top end of the telescopic rod 4231 of the first ejector rod 423 is provided with a rubber block 42312 that matches and is connected to the top end, thereby improving the sealing performance at the pressure inlet of the pressure relief valve 42.

As shown in FIG. 3, FIG. 6 and FIG. 7, the bottom end of the dispenser seat 51 is provided with a curved snap-on plate 514 and a pin assembly 515. The side edge of the top surface of the keg spear seat 41 is provided with a coaxial, annular step 419. The curved snap-on plate 514 is provided with a curved snap-on groove 5141 horizontally matches and snaps onto the annular step 419. The curved surface extension of the curved snap-on groove 5141 is tangent to the side surface of the bottom end of the pin assembly 515. With the above structure, all you need to do to assemble it is to make the bottom surface portion of the dispenser without the curved snap-on plate come into contact with the top surface of the keg spear seat, and push the dispenser sideway to allow the curved snap-on groove to snap onto the annular step and then fix the side surface of the annular step with the pin assembly. This way of connection allows the dispenser to rotate freely 360 degrees on the keg spear seat, thereby achieving the effect of freely adjusting the beer discharge direction, which is simple in structure and is flexible and convenient to use.

As shown in FIG. 7 and FIG. 8, in this embodiment, the pin assembly 515 includes a pin seat 5151, a pin 5152, a return spring 5153 and a grip 5154. The pin seat 5151 is integrally connected to the side edge of the bottom end of the dispenser seat 51, and the top surface of the pin seat 5151 is provided with a grip hole 51511, a pin hole 51512 and a spring hole 51513 which are in vertical communication and are coaxially distributed in sequence. The bore diameter of the pin hole 51512 is smaller than the bore diameter of the grip hole 51511, and the bore diameter of the pin hole 51512 is smaller than the bore diameter of the spring hole 51513. The grip 5154 matches and is inserted into the grip hole 51511, the pin 5152 matches and is inserted into the pin hole 51512, and the top end of the pin 5152 matches and is connected to the bottom end of the grip 5154. The side edge of the bottom end of the pin 5152 is provided with a protruding ring 51521 matching the spring hole 51513, and the return spring 5153 is disposed between the bottom surface of the spring hole 51513 and the protruding ring 51521 and matches and is slipped onto the pin 5152. The curved surface extension of the curved snap-on groove 5141 is tangent to the side surface of the bottom end of the pin 5152. The pin assembly of the present invention adopts the above structure, so that when connecting the dispenser to the keg spear seat, it is only necessary to pull up the grip so that the bottom surface of the pin is higher than the bottom surface of the dispenser. When the curved snap-on groove and the annular step snap to fit into place, as long as the grip is released, the pin automatically engages the side surface of the annular step under the spring force of the return spring, thereby achieving the connection between the dispenser and the keg spear seat.

As shown in FIG. 3, in this embodiment, the grip 5154 has a rectangular cross section, and the cross section of the grip hole 51511 matches that of the grip 5154. With the above structure, the grip of the present invention can be pulled up, and it is only necessary to rotate it by a certain angle to enable it to engage the top surface of the pin seat, thereby preventing the pin from being reset under the force of the return spring.

As shown in FIG. 7, in this embodiment, the axes of the annular step 419 and the curved snap-on groove 5141 are on the same axial line as the axis of the beer tap 52 of the dispenser, so that the dispenser will have smooth running of the piston during 360-degree free rotation, thereby avoiding the eccentricity of the piston.

In this embodiment, the camber angle of the curved snap-on groove 5141 is less than 180 degrees, so that the curved snap-on groove can smoothly slide to snap onto the annular step.

In this embodiment, the camber angle of the curved snap-on groove 5141 is equal to 180 degrees, so that half of the annular step is engaged by the curved snap-on groove, thereby ensuring the maximum engagement surface and improving the connection strength.

In this embodiment, the tangential point of the pin assembly 515 and the curved surface extension of the curved snap-on groove 5141, the center point of the curved snap-on groove 5141, and the axial line are on the same vertical plane, so that the connection of the pin with the curved snap-on groove and the annular step receives an even force, thereby ensuring the connection strength.

As shown in FIG. 2, FIG. 14 and FIG. 15, the beverage preservation keg with an adjustable beer tap further includes a gas charging valve 7 matching and communicating with the gas storage chamber. The gas charging valve 7 includes a gas charging valve connector 71, a gas charging valve body 72, a valve core 73, a valve core return spring 74 and a gas charging valve plug 75. The outer side of the bottom end of the gas charging valve body 72 is provided with a fixed threaded section 721, and the middle of the gas charging valve connector 71 is provided with a coaxial, fixed threaded hole 711 that matches the fixed threaded section 721. The bottom end of the gas charging valve body 72 is provided with a coaxial spring mounting hole 722 that matches the valve core return spring 74, the top end of the gas charging valve body 72 is provided with a coaxial gas charging counterbore 723 communicating with the spring mounting hole 722, and the smaller bore diameter of the gas charging counterbore 723 is smaller than the bore diameter of the spring mounting hole 722. The outer diameter of the valve core 73 is larger than the smaller bore diameter of the gas charging counterbore 723, and the outer diameter of the valve core 73 is smaller than the bore diameter of the spring mounting hole 722. The top end of the valve core 73 is provided with a coaxial ejector pin 73 that is mated with the gas charging counterbore 723 in a clearance fit. The middle of the gas charging valve plug 75 is provided with a plug vent hole 751 which is a through hole. The gas charging valve body 2 and the gas charging valve connector 71 achieve a fixed connection through the matching threaded connection between the fixed threaded section 721 and the fixed threaded hole 711. The valve core 73, the valve core return spring 74 and the gas charging valve plug 75 match and are mounted in the spring mounting hole 722 of the gas charging valve body 72 in sequence from top to bottom. The ejector pin 731 of the valve core 73 is inserted into the smaller bore of the gas charging counterbore 723 in a clearance fit and further into the larger bore of the gas charging counterbore 723. The gas charging valve plug 75 matches and is fixed to the bottom end of the spring mounting hole 722. The valve core return spring 74 is disposed between the bottom end of the valve core 73 and the top end of the gas charging valve plug 75. The gas charging valve of the present invention adopts the above structure, so the resetting force of the valve core return spring 74 and the gas pressure inside the gas storage chamber of the draft beer preservation keg can be utilized, and the two together act to prevent the gas in the gas storage chamber of the draft beer preservation keg from leaking out from the gas charging valve, thereby improving the sealing performance of the gas charging valve. When the resetting force of the valve core return spring fails, as long as the gas pressure in the gas storage chamber of the draft beer preservation keg is large enough, no gas will leak out from the gas charging valve, thereby effectively improving the service life of the gas charging valve.

As shown in FIG. 15, in this embodiment, the valve core 73 includes an ejector pin 731, a sealing ring 732 and a core body 733. The top end of the core body 733 is provided with a receiving counterbore 7331 which is not a through hole, thereby preventing the gas from directly leaking out from the receiving counterbore 7331. The outer diameter of the sealing ring 732 matches the larger bore diameter of the receiving counterbore 7331, and the thickness of the sealing ring 732 matches the larger bore depth of the receiving counterbore 7331. The central hole diameter of the sealing ring 732 matches the smaller bore diameter of the receiving counterbore 7331. The bottom end of the ejector pin 731 is provided with a coaxially disposed receiving rod 7311 that matches the smaller bore of the receiving counterbore 7331. The sealing ring 732 matches and is inserted into the larger bore of the receiving counterbore 7331 of the core body 733, and the receiving rod 7311 of the ejector pin 731 runs through the central hole of the sealing ring 732 and matches and is inserted into the smaller bore of the receiving counterbore 7331. The valve core of the gas charging valve of the present invention adopts the above structure, so the elasticity of the sealing ring 732 is utilized to achieve good sealing performance, thereby preventing gas leakage. The ejector pin 731 is detachable, and the outer diameter of the ejector pin 731 is larger than the outer diameter of the receiving rod 7311, so that the ejector pin 731 can be conveniently taken out from the gas charging counterbore 723, thereby facilitating the replacement of the ejector pin 731.

As shown in FIG. 15, in this embodiment, the bottom end of the gas charging counterbore 723 is provided with a coaxially disposed protruding ring 724 that extends into the spring mounting hole 722. The diameter of the top end of the protruding ring 724 is larger than the hole diameter of the central hole of the sealing ring 732, and the diameter of the top end of the protruding ring 724 is smaller than the outer diameter of the sealing ring 732. The gas charging valve of the present invention adopts the above structure, so that the protruding ring 724 can abut against the elastic sealing ring 732 under the force of the valve core return spring 74, thereby improving the sealing performance, and thus preventing gas leakage.

As shown in FIG. 15, in this embodiment, the bottom end of the valve core 73 is provided with a limit guiding column 734 that matches and is inserted into the valve core return spring 74. The limit guiding column 734 is inserted into the valve core return spring 74 to function as a limiting guide for the valve core return spring 74, thereby preventing the valve core return spring 74 from offsetting to cause gas leakage.

As shown in FIG. 14 and FIG. 15, in this embodiment, the top end of the gas charging valve body 72 is provided with a protective cover 76 covering the gas charging counterbore 723, which functions as a dustproof protection for the gas charging counterbore 723 when not used for charging gas.

As shown in FIG. 14 and FIG. 15, in this embodiment, the protective cover 76 is provided with a perpendicular connecting rod 761, and the top surface of the gas charging valve body 72 is provided with a connecting hole 725 matching the connecting rod 761. The protective cover 76 is inserted into the connecting hole 725 through the connecting rod 761 to achieve a fixed connection with the gas charging valve body 72. The protective cover 76 can rotate with the axial line of the connecting rod 761 as an axis. When gas charging is required, it is only necessary to rotate the protective cover 76 to expose the gas charging counterbore 723. When the gas charging is not required, it is only necessary to rotate the protective cover 76 to cover the gas charging counterbore 723 to function as a dustproof protection.

As shown in FIG. 15, in this embodiment, the gas charging valve plug 75 is fixed to the bottom end of the spring mounting hole 722 through a threaded connection. The gas charging valve plug 75 and the spring mounting hole 722 can also achieve a detachable fixed connection through a rotary connector structure. In addition, the plug vent hole 751 of the gas charging valve plug 75 may be an inner hexagonal hole, thereby facilitating the use of an inner hexagon spanner to achieve a threaded connection.

As shown in FIG. 15, in this embodiment, the tail end of the fixed threaded section 721 is provided with a limit step surface 7211. A first O-ring seal 77 is disposed between the limit step surface 7211 and the top surface of the gas charging valve connector 71 to effectively prevent the gas in the gas storage chamber of the draft beer preservation keg from leaking out from the threaded connection portion between the gas charging valve body 72 and the gas charging valve connector 71, thereby improving the gas sealing performance.

As shown in FIG. 14 and FIG. 15, in this embodiment, the inner wall of the larger bore of the gas charging counterbore 723 is provided with a matching second O-ring seal 78. The second O-ring seal disposed at the gas charging valve of the present invention can function as a seal to prevent gas leakage during the gas charging when gas is charged into the gas storage chamber of the draft beer preservation keg by a gas charging device.

As shown in FIG. 14, in this embodiment, the outer side of the gas charging valve body 72 is provided with a regular hexagonal body 726, which is convenient for the user to use a spanner tool to fix the gas charging valve body 72 into the fixed threaded hole 711 of the gas charging valve connector 71 through the threaded connection.

When the gas charging valve of the present invention does not charge gas, the valve core return spring 74 is pressed against the valve core 73 such that the sealing ring 732 of the valve core 73 abuts against the protruding ring 724 to achieve sealing, so that the gas cannot escape from the gas charging counterbore 723. The protective cover 76 can cover the gas charging counterbore 723 to function as a dustproof protection. When the gas charging valve charges gas, the gas charging device ejects the ejector pin 731 away, so that the sealing ring 732 of the valve core 73 is disengaged from the protruding ring 724, and thus, the high pressure in the gas charging device passes through the gas charging valve to enter the gas storage chamber of the draft beer preservation keg. The second O-ring seal 78 can seal the gas charging device to prevent gas from leaking out from the gas charging counterbore 723 during gas charging. In addition, when the valve core return spring 74 fails, after the gas is charged into the gas storage chamber of the draft beer preservation keg to a certain pressure, it is also possible to push the valve core 73 to seal by the gas pressure inside the gas storage chamber of the draft beer preservation keg.

Figure 16:
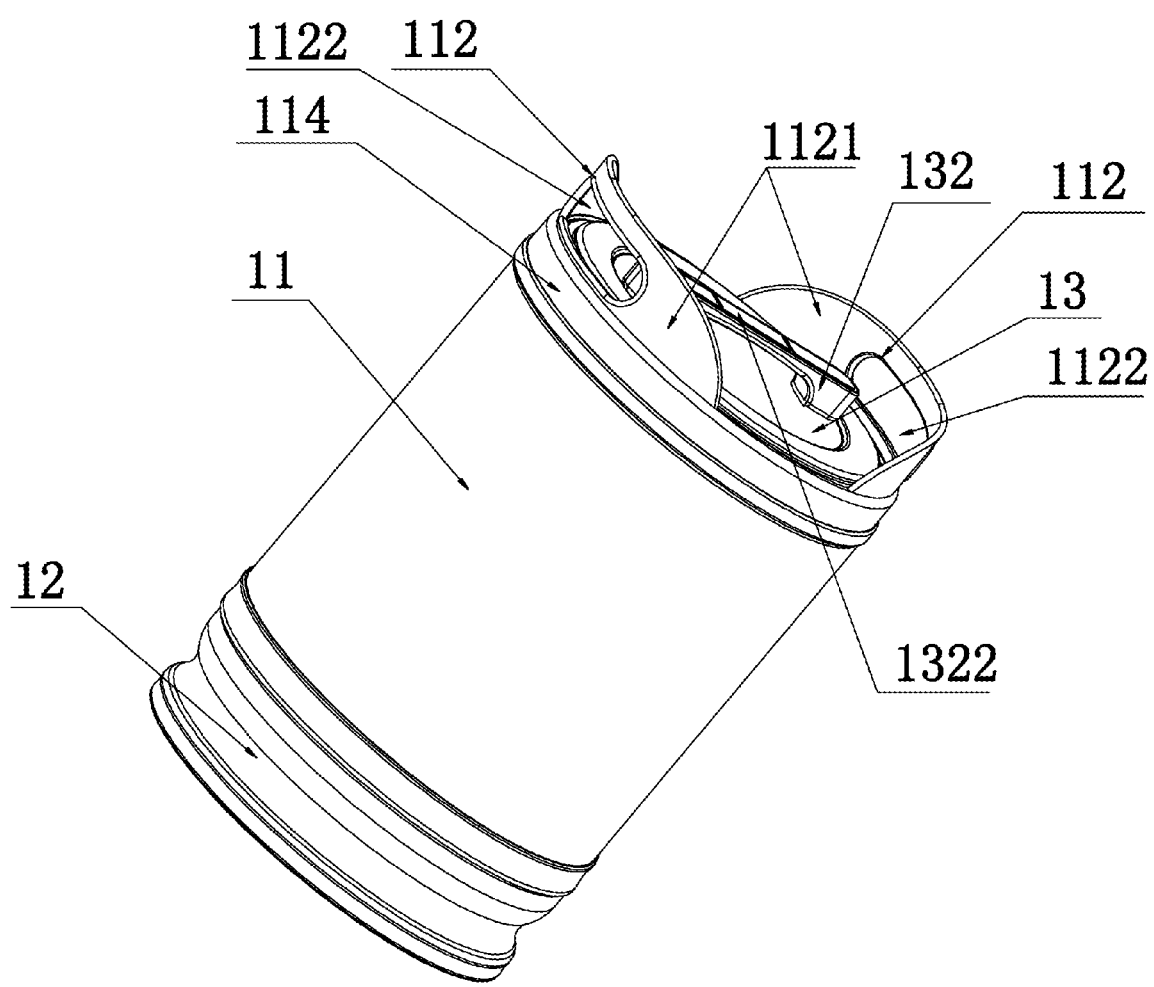
FIG. 16 is a schematic view showing the structure of a shell of the present invention.
Figure 19:
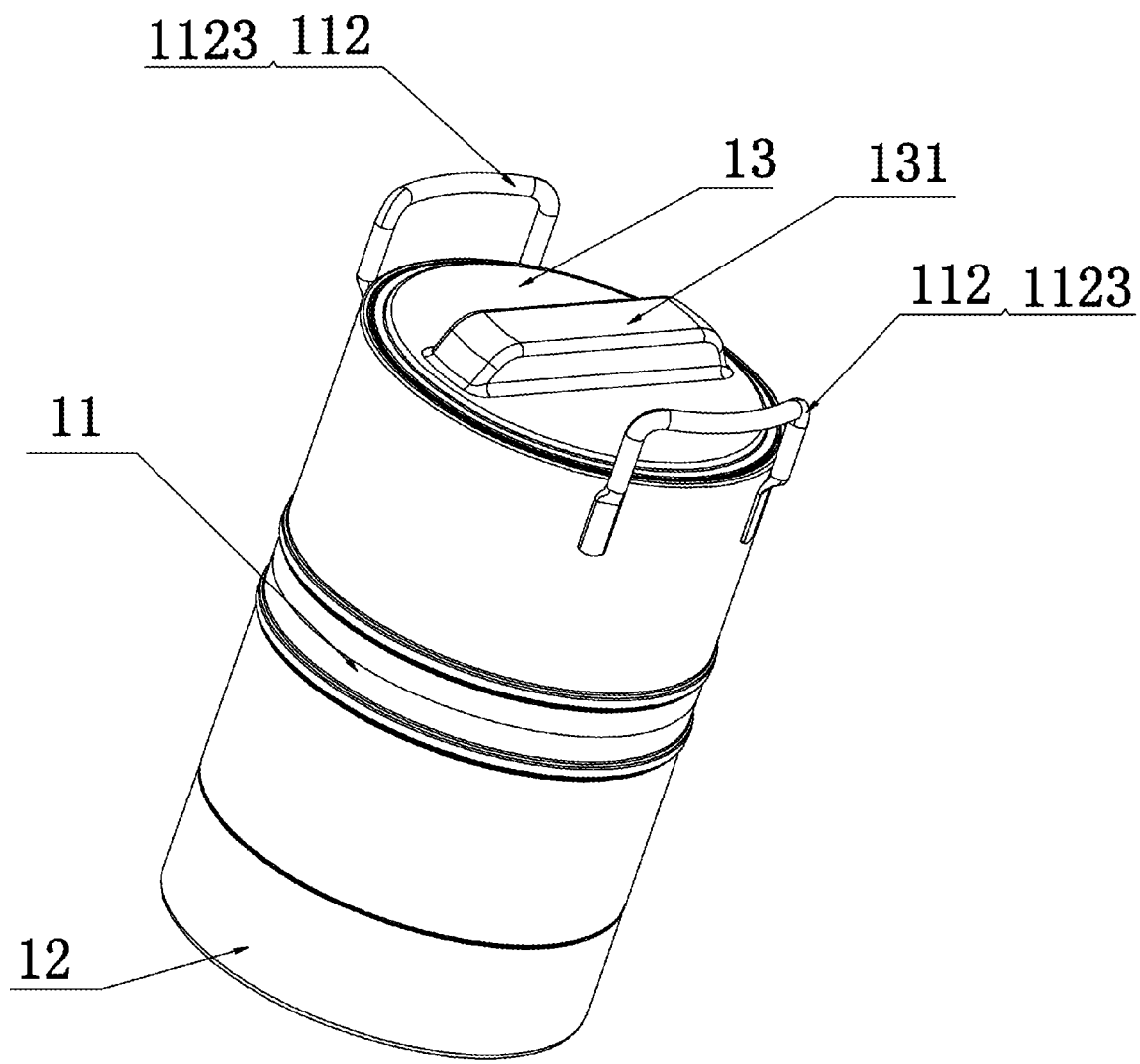
FIG. 19 is a schematic view showing the structure of another shell of the present invention.

As shown in FIG. 16 and FIG. 19, in this embodiment, the shell includes a casing 11, a base 12 and a cover plate 13. The inside of the casing 11 is provided with an inner container mounting hole 111 matching the inner container of the draft beer preservation keg, and the outer side of the top end of the casing 11 is provided with two symmetrically distributed lifting handles 112. The base 12 is a socket ring matching and being fixedly connected to the bottom end of the casing 11. The cover plate 13 matches and is fixedly connected to the top end of the casing 11 through a detachable structure and covers the top opening of the inner container mounting hole 111. By adopting the above structure, the shell 1 of the present invention not only can function as a protection for the internal structure of the draft beer preservation keg, but also is convenient lift up and carry, and also allows the contained draft beer preservation keg to be stable on an uneven ground. The cover plate 13 and the base 12 may also have a detachable connection structure, so that a sealed space can be formed in the base 12 for storing cooling materials such as ice cubes, and thus, the draft beer preservation keg can be kept in a cool state for a long time, thereby improving the taste of the draft beer.

Figure 17:
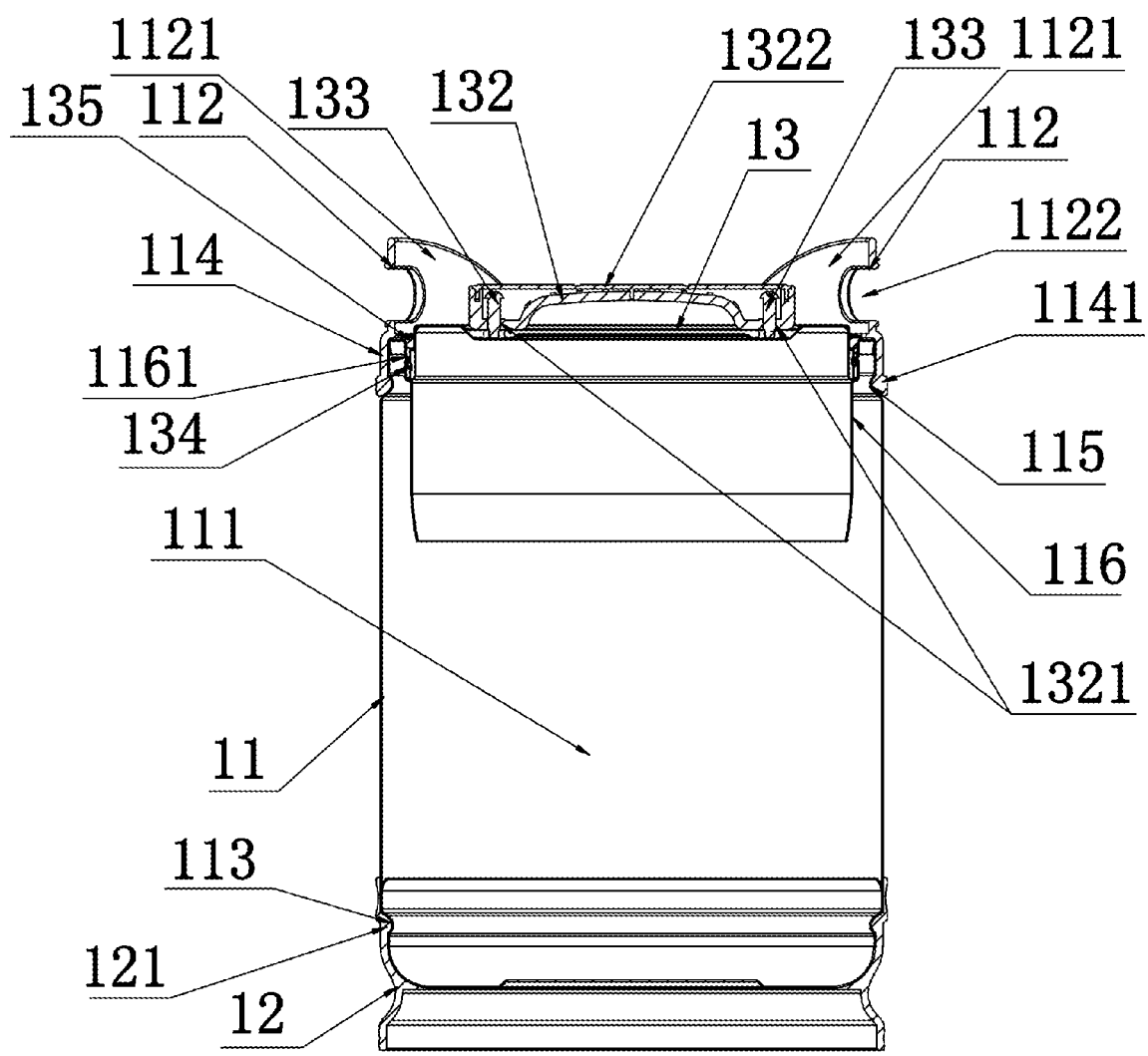
FIG. 17 is a schematic cross-sectional view showing the structure of the shell of the present invention.
Figure 18:
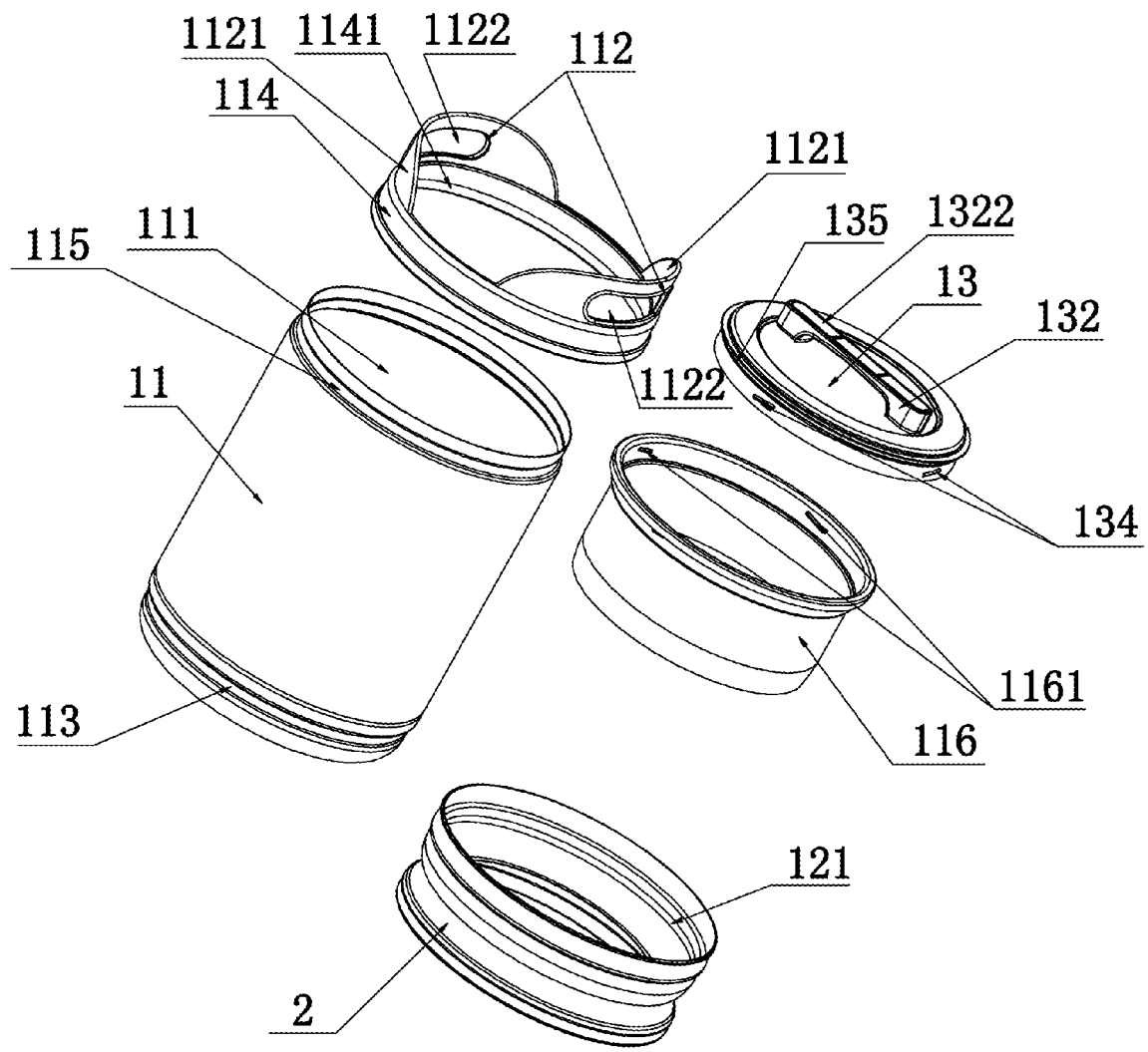
FIG. 18 is a schematic exploded view showing the structure of the shell of the present invention.

As shown in FIG. 17 and FIG. 18, in this embodiment, the outer side of bottom end of the casing 11 is provided with a first annular snap groove 113, the inner side of the top end of the base 12 is provided with a first snap ring 121 matching the first annular snap groove 113, and the base 12 matches and engages the first annular snap groove 113 through the first snap ring 121 to achieve the detachable snap connection with the casing 11. The shell 1 of the present invention adopts the above structure to facilitate the disassembly and assembly of the base 12 at the bottom of the casing 11. When the space is limited, the base can also be disassembled for storage, which is simple in structure and is economical and practical.

As shown in FIG. 17 and FIG. 18, in this embodiment, the outer side of the top end of the casing 11 is provided with an annular movable sleeve 114, the outer side of the top end of the casing 11 is further provided with a second annular snap groove 115, the inner side of the bottom end of the annular movable sleeve 114 is provided with a second snap ring 1141 matching the second annular snap groove 115, and the annular movable sleeve 114 achieves a detachable snap connection with the casing 11 through the snap connection between the second snap ring 1141 and the second annular snap groove 115. The two lifting handles 112 are integrally connected to the bottom end of the annular movable sleeve 114 and symmetrically distributed. The lifting handle 112 is a curved plate 1121 coaxial with the annular movable sleeve 114, and the side surface of the curved plate 1121 is provided with a lifting handle hole 1122 for hand insertion. The shell 1 of the present invention adopts the above structure, so the annular movable sleeve 114 can be conveniently disassembled and assembled, and the annular movable sleeve 114 can be rotated freely, so that the lifting handle hole 1122 can be rotated to a direction that is most convenient to hold with hand. The lifting handle 112 may also be two lifting handle holes 1122 that are symmetrically disposed directly on the outer side of the annular movable sleeve 114.

Figure 20:
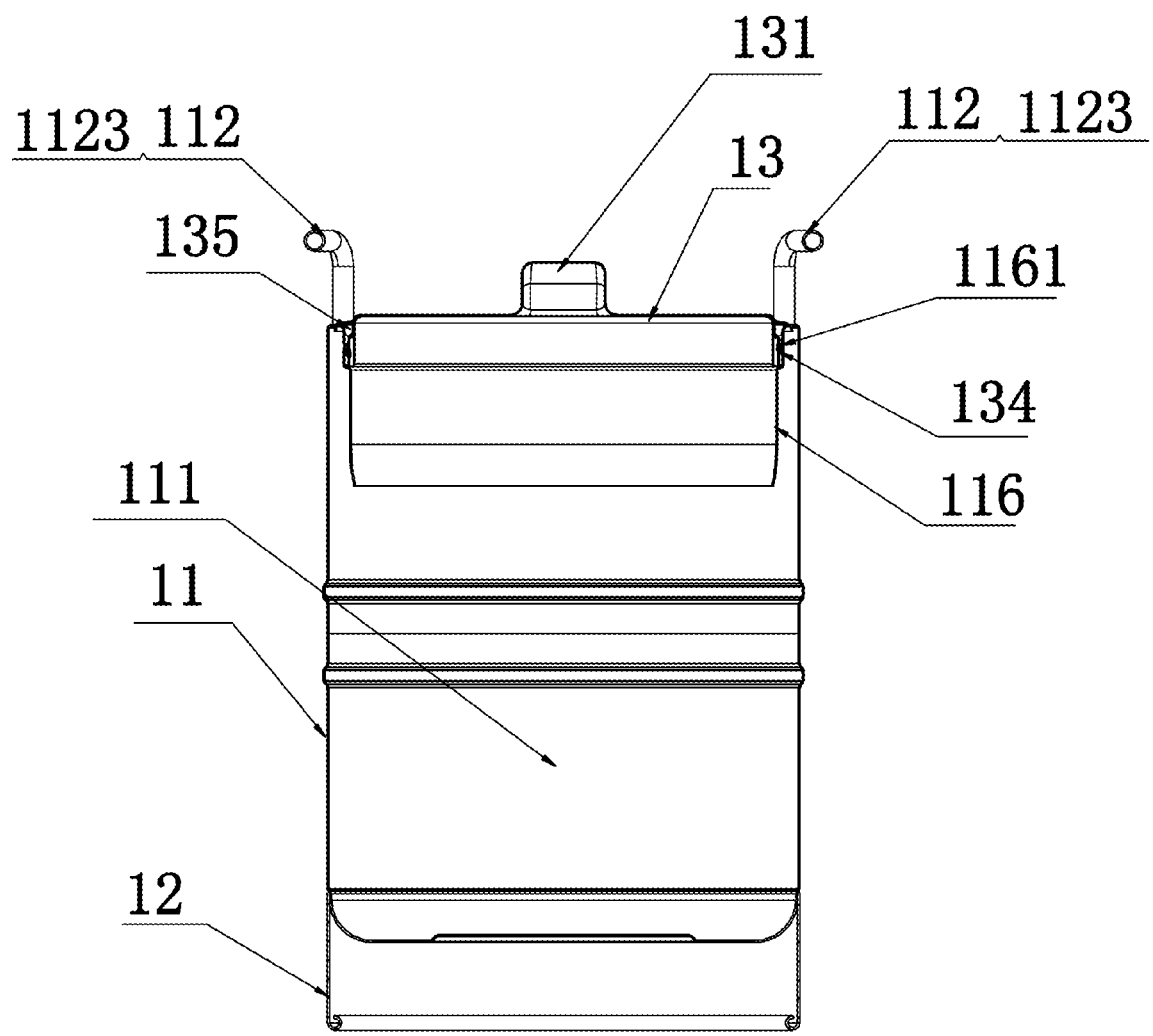
FIG. 20 is a schematic cross-sectional view showing the structure of another shell of the present invention.

As shown in FIG. 19 and FIG. 20, in this embodiment, the lifting handle 112 is an n-shaped bent rod 1123, and two opening ends at the bottom of the n-shaped bent rod 1123 match and are fixedly connected to the outer sides of the top end of the casing 11. The two n-shaped bent rods 1123 are symmetrically distributed on two sides of the top end of the casing 11. By adopting the above structure, the lifting handle 112 of the shell 1 of the present invention is simple in structure, saves the material, and is economical and practical. The n-shaped bent rod forms a certain angle α with the axial line of the casing 11, that is, the n-shaped bent rod is inclined outward relative to the casing 11, and the angle α is 45-60°, which is convenient for the user to apply force and lift.

As shown in FIG. 19, in this embodiment, the top end of the cover plate 13 is provided with an integrally connected linear handle 131, so that the cover plate 13 can be opened by holding the linear handle 131.

As shown in FIG. 16, FIG. 17 and FIG. 18, in this embodiment, the top end of the cover plate 13 is provided with an n-shaped handle 132, the two opening ends at the bottom of the n-shaped handle 132 are each provided with a fixing screw through hole 1321 running through its top, and the n-shaped handle 132 is fixedly connected to the top surface of the cover plate 13 through a thread after the fixing screw 133 runs through the fixing screw through hole 1321. The top end of the n-shaped handle 132 is further provided with a handle cover 1322 covering the fixing screw 133, and the handle cover 1322 and the n-shaped handle 132 snap to fit into place. The cover plate 13 of the shell 1 of the present invention adopts the above n-shaped handle 132, so that a hand can be inserted into the n-shaped handle 132, and thus, the cover plate 13 can be held more firmly.

As shown in FIG. 17, FIG. 18 and FIG. 20, in this embodiment, the top end opening of the inner container mounting hole 111 is provided with a matching and fixedly connected annular liner 116. The annular liner 116 can be used to clamp the inner container from above after the inner container of the draft beer preservation keg is mounted in the inner container mounting hole, thereby fixing the inner container of the draft beer preservation keg. The inner side wall of the inner container mounting hole 111 forms a snap ring due to the second annular snap groove 115, and the outer side wall of the annular liner 116 may be provided with an annular snap groove matching the snap ring, so that the matching engagement between the snap ring and the annular snap groove may be utilized to achieve the snap connection between the annular liner 116 and the inner container mounting hole 111.

As shown in FIG. 17, FIG. 18 and FIG. 20, in this embodiment, an inner hole wall of the annular liner 116 is provided with at least two first inclined protruding strips 1161 uniformly distributed in a circular array with its axial line as an axis. The outer side of the cover plate 13 is provided with matching second inclined protruding strips 134 that correspond individually to each of the inclined protruding strips 1161, and all the second inclined protruding strips 134 are uniformly distributed in a circular array with the axial line of the cover plate 13 as an axis. The cover plate 13 achieves a detachable fixed connection with the casing 11 at the top end of the casing 11 through an axial limiting engagement between the first inclined protruding strips 1161 and the second inclined protruding strips 134. The cover plate 13 and the annular liner 116 can also be detachably connected by a threaded connection structure or can be connected by other connector structures. In addition, there are three first inclined protruding strips 1161 and three second inclined protruding strips 134, and the rotary engagement between the cover plate 13 and the casing 11 is made stable and secure through the principle that three points form a plane. In the shell of another draft beer preservation keg, there are four first inclined protruding strips 1161 and four second inclined protruding strips 134.

As shown in FIG. 16, FIG. 18 and FIG. 20, in this embodiment, the outer side of the top end of the cover plate 13 is provided with a cover plate sealing ring 135 matching the top end of the annular liner 116 to ensure the sealing performance of the top opening of the inner container mounting hole 111 after being covered by the cover plate 13. The outer side of the bottom of the cover plate 13 is provided with an extended surface larger than the inner hole diameter of the annular liner 116, and the cover plate sealing ring 135 is disposed on the extended surface, so that the cover plate sealing ring 135 is located between the bottom surface of the extended surface and the top surface of the annular liner 116, thereby ensuring good sealing performance.

In this embodiment, the bottom end of the casing 11 may be a detachable bottom, thereby facilitating the removal or insertion of the inner container of the draft beer preservation keg from or into the bottom of the casing 11. The casing 11 can be assembled from the upper casing and the lower casing. Compared with the processing of the whole casing, the separate processing of the upper and lower casings lowers the height to be processed, and thus, enhances the accuracy, thereby lowering the processing difficulty in production. In addition, the inner wall of the inner container mounting hole 111 may also be provided with an annular snap groove to engage the snap ring on the outer wall of the inner container, thereby achieving a fixed coupling with the inner container.

Figure 21:
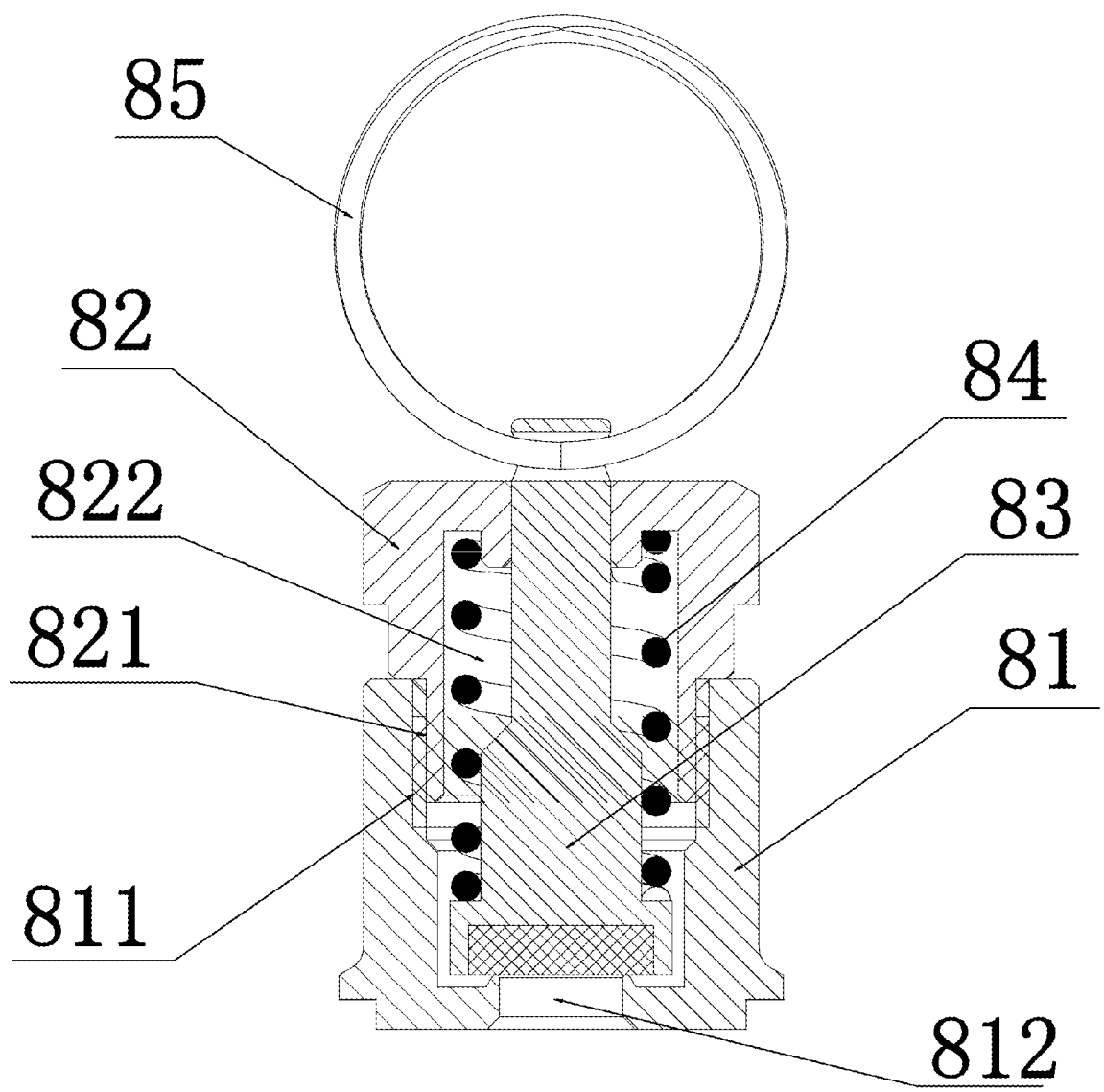
FIG. 21 is a schematic view showing the structure of a pressure maintaining valve of the present invention.

As shown in FIG. 1 and FIG. 21, in this embodiment, the beverage preservation keg with an adjustable beer tap further includes a pressure maintaining valve 8 match and communicating with the gas storage chamber 21. The pressure maintaining valve 8 includes a pressure maintaining valve seat 81, a pressure maintaining valve body 82, a pressure maintaining valve core 83, a pressure maintaining return spring 84 and a pull ring 85. The top end of the pressure maintaining valve seat 81 is provided with a valve body threaded hole 811 matching and fixedly connected with the pressure maintaining valve body 82 through a thread, the outer side of the bottom section of the pressure maintaining valve body 82 is provided with a valve body threaded section 821 matching the valve body threaded hole 811, and the pressure maintaining valve body 82 achieves the fixed connection with the pressure maintaining valve seat 81 through the matching threaded connection between the valve body threaded section 821 and the valve body threaded hole 811. Other detachable fixed connection structures may also be adopted between the pressure maintaining valve seat 81 and the pressure maintaining valve body 82. The bottom end of the pressure maintaining valve seat 81 is provided with a pressure maintaining vent hole 812 communicating with the valve body threaded hole 811, and the pressure maintaining vent hole 812 communicates with the gas storage chamber 21. The bottom end of the pressure maintaining valve body 82 is provided with a pressure maintaining return spring mounting hole 822 matching the pressure maintaining return spring 84, and the pressure maintaining return spring 84 matches and is fitted into the pressure maintaining return spring mounting hole 822. The pressure maintaining valve core 83 matches and is inserted into the pressure maintaining return spring 84, the bottom end of the pressure maintaining valve core 83 is provided with a sealing gasket and covers the top opening of the pressure maintaining vent hole 812, and the top end of the pressure maintaining valve core 83 protrudes from the top end of the pressure maintaining valve body 82 and matches and is connected to the pull ring 85. The pressure maintaining return spring 84 acts between the hole bottom surface of the pressure maintaining return spring mounting hole 822 and the pressure maintaining valve core 83. The pressure maintaining valve of the present invention adopts the above structure, so the sealing can be achieved by the spring force of the pressure maintaining return spring 84 offsetting the gas pressure of the gas storage chamber 21. When the gas pressure in the gas storage chamber 21 is too large, after the pressure maintaining valve core 83 is ejected away against the spring pressure of the pressure maintaining return spring 84 such that the pressure is relieved to become stable, the pressure maintaining return spring 84 is reset to reseal. The pull ring 85 can be manually pulled up for a pressure relief.

The above describes only preferred embodiments of the present invention. It should be noted that those skilled in the art may also make several improvements and modifications without departing from the technical principles of the present invention, and such improvements and modifications should also be considered to fall within the protection scope of the present invention.

What is claimed is:

1. A beverage preservation keg with an adjustable beer tap, wherein the beverage preservation keg with an adjustable beer tap comprises a shell, an inner container wrapped by the shell, and a gas-liquid control device; the inner container is divided into an upper layer and a lower layer, comprising an upper gas storage chamber for storing a gas and a lower beer storage chamber for storing a liquid; the gas-liquid control device comprises a keg spear with a pressure relief valve, a dispenser with a beer tap throttle valve, and a beer discharge pipe; the keg spear matches and connects the gas storage chamber and the beer storage chamber, and the top end of the keg spear matches and is connected to the dispenser; the dispenser is matches and is connected to the beer discharge pipe;

wherein the keg spear connects a gas passage from the gas storage chamber to the beer storage chamber; the keg spear, the dispenser and the beer discharge pipe connect a liquid passage pipe from the beer storage chamber to the outside; and the dispenser with the beer tap throttle valve is capable of controlling and adjusting a liquid flow of beer being discharged, wherein the dispenser comprises a dispenser seat, a beer tap, an operating device and a throttle valve; the center of the dispenser seat is provided with a beer tap receiving hole for movably receiving the beer tap; the operating device is respectively connected to the dispenser seat and the beer tap; the beer tap is controlled by the operating device to perform a beer tap movement in the beer tap receiving hole of the dispenser seat; and the throttle valve matches and is mounted in the beer tap, and the throttle valve is capable of adjusting the liquid flow inside the beer tap.

2. The beverage preservation keg with an adjustable beer tap according to claim 1, wherein the bottom end of the beer tap is provided with a liquid inlet in fluid communication with the keg spear, and the side edge of the beer tap is provided with a liquid outlet which matches and is connected to the beer discharge pipe; the top end of the beer tap is further provided with a throttle valve mounting hole that matches the throttle valve, the bottom end of the throttle valve mounting hole matches and communicates with the liquid inlet, and the side edge of the throttle valve mounting hole matches and communicates with the liquid outlet; the throttle valve comprises a valve body that matches the throttle valve mounting hole, and a valve switch for controlling an up-and-down movement of the valve body;

when the valve switch controls the valve body to move downward until the valve body is sealed and received by the throttle valve mounting hole, the liquid inlet does not communicate with the liquid outlet through the throttle valve mounting hole, and a beer discharge passage inside the beer tap is closed; and when the valve switch controls the valve body to move upward until the valve body and the throttle valve mounting hole are gradually separated to form a gap, the liquid inlet communicates with the liquid outlet through the gap inside the throttle valve mounting hole, and the beer discharge passage inside the beer tap is opened.

3. The beverage preservation keg with an adjustable beer tap according to claim 2, wherein the valve body comprises a lower valve body having a cone structure with a larger top and a smaller bottom, and an upper valve body which matches and coaxially and fixedly receives the top end of the lower valve body; the bottom section of the throttle valve mounting hole is a conical hole that matches the cone structure of the lower valve body; the valve switch is a knob switch, and the middle of the knob switch is provided with a coaxial, positioning and coupling through hole; the top end of the upper valve body is provided with an integrally connected, coaxial, positioning and mating protrusion which is matches the positioning and coupling through hole, and the top end of the positioning and mating protrusion is provided with a coaxial, threaded fixing hole; and the knob switch matches and is coupled onto the positioning and mating protrusion through the positioning and coupling through hole, and realizes linkage fixation between the knob switch and the valve body through a threaded connection between a valve body screw and the threaded fixing hole; and the knob switch is in a threaded connection with the top end of the beer tap, and the knob switch adjusts the up-and-down movement of the linked valve body inside the throttle valve mounting hole through adjusting the threaded connection with the beer tap.

4. The beverage preservation keg with an adjustable beer tap according to claim 3, wherein the throttle valve further comprises a valve body limiting member, the middle of the valve body limiting member is provided with a coaxial through hole, and the bore diameter of the through hole is smaller than a maximum outer diameter of the valve body; and the valve body limiting member is in a removable, fixed connection with the top of the beer tap.

5. The beverage preservation keg with an adjustable beer tap according to claim 1, wherein the top end of the dispenser seat is provided with two vertically disposed operating support poles, and the distances from the two operating support poles to the axial line of the beer tap receiving hole are equal; the operating device comprises a U-shaped movable plate and a handle; the two top ends of the U-shaped movable plate respectively match and are hinged to the top ends of the two operating support poles through bolts, and the middle of the tail end of the U-shaped movable plate matches and is connected to the handle; inner side walls of the two side plates of the U-shaped movable plate are provided with symmetrically disposed cylindrical keys; two sides of the top end of the beer tap are provided with symmetrically and horizontally distributed slideways, and the width of the slideway matches the cross-sectional diameter of the cylindrical key;

the top surface of the dispenser seat is further provided with a vertically disposed gear plate, the gear plate is close to an inner side wall of the tail end of the U-shaped movable plate, and the surface of the gear plate that is close to the inner side wall of the tail end of the U-shaped movable plate is a cambered surface that matches the movement of the U-shaped movable plate;

the handle comprises a fixed grip, an ejector rod, an ejector rod return spring and a movable grip; the fixed grip is integrally connected with the middle of the tail end of the U-shaped movable plate, and the inside of the fixed grip is provided with a first counterbore which is a through hole; a larger bore opening of the first counterbore runs through the middle of the tail end of the U-shaped movable plate; the ejector rod comprises an ejector head, a larger cylindrical section matching a larger bore diameter of the first counterbore, and a smaller cylindrical section matching and mating with a smaller bore diameter of the first counterbore, which are coaxially and integrally connected in sequence, and the tail end of the smaller cylindrical section is provided with a circlip groove; after running through the first counterbore, the ejector rod fixes the circlip groove to the tail end of the fixed grip through a gasket and a circlip, and an outer diameter of the gasket is larger than an outer diameter of the fixed grip; the ejector rod return spring is disposed between the larger bore bottom end of the first counterbore and the larger cylindrical section and matches and is coupled onto the smaller cylindrical section; the inside of the movable grip is provided with a second counterbore which is a through hole, a smaller bore diameter of the second counterbore matches and fits with an outer diameter of the fixed grip, and a larger bore diameter of the second counterbore matches and fits with an outer diameter of the gasket; and the cambered surface is provided with a first gear slot, a second gear slot and a third gear slot which match the ejector head in sequence from top to bottom.

6. The beverage preservation keg with an adjustable beer tap according to claim 1, wherein the keg spear comprises a keg spear seat, a pressure relief valve, an inner tube fixing sleeve, an inner tube fixing spring and an inner tube assembly; the pressure relief valve is disposed at an appropriate location on the outer side surface of the keg spear seat, and a pressure inlet of the pressure relief valve matches and communicates with the gas storage chamber; and the top end of the keg spear seat is provided with a beer tap movable hole matching the beer tap of the dispenser, the side surface of the beer tap movable hole is provided with a valve device that is linked to and matches the beer tap, and the valve device respectively communicates with a stable pressure outlet of the pressure relief valve and the beer tap movable hole.

7. The beverage preservation keg with an adjustable beer tap according to claim 6, wherein the pressure relief valve comprises a valve body casing, a first compression spring, a mushroom-shaped first ejector rod, a second compression spring and a pressing block; the first compression spring, the first ejector rod, the second compression spring and the pressing block are coaxially distributed in sequence from left to right in the valve body casing; the first ejector rod comprises a telescopic rod and a mushroom head which are coaxially and integrally connected;

the valve body casing comprises a front casing and a rear casing; the front end of the front casing is provided with a third counterbore which is a through hole, and a smaller bore diameter of the third counterbore matches an outer diameter of the telescopic rod; the rear casing is provided with a mushroom head receiving hole, a pressing block receiving hole and a pressing hole which are coaxially bored in sequence from front to rear, the bore diameter of the mushroom head receiving hole matches the outer diameter of the mushroom head, the bore diameter of the pressing block receiving hole matches the outer diameter of the pressing block, and the bore diameter of the pressing hole is smaller than the diameter of the pressing block receiving hole; the outer side of the rear end of the front casing is provided with a first threaded section coaxial with the third counterbore, and the front end of the mushroom head receiving hole is provided with a first threaded hole matching the first threaded section;

the front casing and the rear casing achieve a fixed connection through a matching threaded connection of the first threaded section and the first threaded hole; the mushroom head of the first ejector rod matches and is inserted into the mushroom head receiving hole, and the telescopic rod of the first ejector rod matches and is inserted into the smaller bore of the third counterbore; the first compression spring matches and is slipped onto the telescopic rod and disposed between the rear end surface of the front casing and the bottom of the mushroom head; the pressing block matches and is inserted into the pressing block receiving hole; the second compression spring is disposed between the top of the mushroom head and the pressing block; and the pressure inlet of the pressure relief valve is a larger bore opening end of the third counterbore axially covered by the top end of the telescopic rod, and the stable pressure outlet of the pressure relief valve is a larger bore opening end of the third counterbore that is not axially covered by the top end of the telescopic rod.

8. The beverage preservation keg with an adjustable beer tap according to claim 7, wherein the rear end of the pressing block is further provided with a coaxial ejector column, and an outer diameter of the ejector column matches the bore diameter of the pressing hole, and the ejector column protrudes from the rear end of the rear casing;

the keg spear with the pressure relief valve further comprises an adjustment knob, and the front end of the adjustment knob is provided with a second threaded hole which is not a through hole; the outer side of the rear end of the rear casing is provided with a second threaded section matching the second threaded hole; and the adjustment knob achieves a fixed connection with the rear end of the rear casing through the matching threaded connection of the second threaded hole and the second threaded section, and the hole bottom of the second threaded hole abuts against the tail end of the ejector column.

9. The beverage preservation keg with an adjustable beer tap according to claim 8, wherein the top of the mushroom head is provided with a coaxial first compression spring receiving hole that matches the second compression spring, the front end of the pressing block is provided with a coaxial second compression spring receiving hole that matches the second compression spring, and the two ends of the second compression spring are respectively inserted into the first compression spring receiving hole and the second compression spring receiving hole.

10. The beverage preservation keg with an adjustable beer tap according to claim 8, wherein a first O-ring is disposed between the smaller bore of the third counterbore and the telescopic rod; a second O-ring is disposed between the mushroom head receiving hole and the mushroom head; and a third O-ring is disposed between the pressing hole and the ejector column.

11. The beverage preservation keg with an adjustable beer tap according to claim 10, wherein the side edge of the top end of the telescopic rod is provided with a radial side hole, and the side hole communicates with the larger bore of the third counterbore, and the side hole is disposed at the front end of the first O-ring; and the top of the mushroom head of the first ejector rod is provided with a vent hole that communicates with the side hole.

12. The beverage preservation keg with an adjustable beer tap according to claim 6, wherein the valve device comprises a screw, an ejector block return spring, an ejector block and an second ejector rod; the outer side surface of the top end of the keg spear seat is provided with a threaded hole matching the screw, the tail end of the threaded hole is provided with a gas hole communicating with the beer tap movable hole, and the gas hole matches and receives the second ejector rod; the tail end of the second ejector rod matches and is connected to the ejector block; the tail end of the screw is provided with a receiving hole matching the ejector block, and the ejector block return spring is disposed between the ejector block and the bottom end of the receiving hole; the outer side surface of the screw is provided with a fourth O-ring matching the threaded hole; and the stable pressure outlet of the pressure relief valve matches and communicates with the threaded hole.

13. The beverage preservation keg with an adjustable beer tap according to claim 6, wherein the bottom end of the keg spear seat is provided with a fourth counterbore communicating with the beer tap movable hole, and the inner wall of the larger bore of the fourth counterbore is fixedly connected to the outer wall of the inner tube fixing sleeve through a thread;

the inner tube assembly comprises an inner tube, an intake sealing ring, a plug and a plug return spring; the intake sealing ring is disposed at the top end of the inner tube; the middle portion of the inner tube is provided with a plurality of inner bosses uniformly distributed in a circular array with its axial line as an axis; the plug return spring is disposed between the inner bosses and the plug, and the plug is pressed upward against and sealed with the inner ring of the intake sealing ring under the action of the spring force of the plug return spring; the top surface of the inner tube fixing sleeve is provided with a fifth counterbore running through the bottom surface, and the smaller bore of the fifth counterbore and the inner tube are mated in a clearance fit; the outer side surface of the inner tube near the top end is provided with a step surface projecting outward, and the inner tube fixing spring is disposed between the bottom surface of the larger bore of the fifth counterbore and the step surface and matches and is slipped onto the inner tube;

a portion of the fourth counterbore in communication with the beer tap movable hole is provided with an annular protrusion; and the outer ring of the intake sealing ring is pressed upward against and sealed with the annular protrusion under the action of the spring force of the inner tube fixing spring.

14. The beverage preservation keg with an adjustable beer tap according to claim 13, wherein the inside of the keg spear seat is provided with a first hole communicating with the stable pressure outlet of the pressure relief valve and the valve device; the top end of the inner tube fixing sleeve is provided with a second hole communicating with the gas storage chamber, and the top end of the inner tube fixing sleeve is further provided with a coaxial annular groove communicating with the second hole; the bottom surface of the larger bore of the fourth counterbore is provided with a third hole communicating with the pressure inlet of the pressure relief valve, and the distance of the third hole from the opening end of the bottom surface of the larger bore of the fourth counterbore to the axial line of the fourth counterbore is equal to the radius of the annular groove;

a sealing gasket is disposed between the top surface of the inner tube fixing sleeve and the bottom surface of the larger bore of the fourth counterbore, and the bore diameter of the sealing gasket is smaller than the bore diameter of the annular groove; a threaded connection portion between the inner wall of the larger bore of the fourth counterbore and the outer wall of the inner tube fixing sleeve is provided with a fifth O-ring; and the top end of the telescopic rod of the first ejector rod is provided with a rubber block that matches and is connected to the ejector rod.

15. The beverage preservation keg with an adjustable beer tap according to claim 6, wherein the bottom end of the dispenser seat is provided with a curved snap-on plate and a pin assembly; the side edge of the top surface of the keg spear seat is provided with a coaxial, annular step; the curved snap-on plate is provided with a curved snap-on groove horizontally snapped onto the annular step; the curved surface extension of the curved snap-on groove is tangent to the side surface of the bottom end of the pin assembly;

the pin assembly comprises a pin seat, a pin, a return spring and a grip; the pin seat is integrally connected to the side edge of the bottom end of the dispenser seat, and the top surface of the pin seat is provided with a grip hole, a pin hole and a spring hole which are vertically through and coaxially distributed in sequence; the bore diameter of the pin hole is smaller than the bore diameter of the grip hole, and the bore diameter of the pin hole is smaller than the bore diameter of the spring hole; the grip matches and is inserted into the grip hole, the pin is matches and is inserted into the pin hole, and the top end of the pin matches and is connected to the bottom end of the grip; the side edge of the bottom end of the pin is provided with a protruding ring matching the spring hole, and the return spring is disposed between the bottom surface of the spring hole and the protruding ring and matches and is slipped onto the pin; and the curved surface extension of the curved snap-on groove is tangent to the side surface of the bottom end of the pin.

16. A beverage preservation keg with an adjustable beer tap, wherein the beverage preservation keg with an adjustable beer tap comprises a shell, an inner container wrapped by the shell, and a gas-liquid control device; the inner container is divided into an upper layer and a lower layer, comprising an upper gas storage chamber for storing a gas and a lower beer storage chamber for storing a liquid; the gas-liquid control device comprises a keg spear with a pressure relief valve, a dispenser with a beer tap throttle valve, and a beer discharge pipe; the keg spear matches and connects the gas storage chamber and the beer storage chamber, and the top end of the keg spear matches and is connected to the dispenser; the dispenser is matches and is connected to the beer discharge pipe;

wherein the keg spear connects a gas passage from the gas storage chamber to the beer storage chamber; the keg spear, the dispenser and the beer discharge pipe connect a liquid passage pipe from the beer storage chamber to the outside; and the dispenser with the beer tap throttle valve is capable of controlling and adjusting a liquid flow of beer being discharged, wherein the beverage preservation keg with an adjustable beer tap further comprises a gas charging valve matching and communicating with the gas storage chamber, the gas charging valve comprising a gas charging valve connector, a gas charging valve body, a valve core, a valve core return spring and a gas charging valve plug; the outer side of the bottom end of the gas charging valve body is provided with a fixed threaded section, and the middle of the gas charging valve connector is provided with a coaxial, fixed threaded hole that matches the fixed threaded section; the bottom end of the gas charging valve body is provided with a coaxial spring mounting hole that matches the valve core return spring, the top end of the gas charging valve body is provided with a coaxial gas charging counterbore communicating with the spring mounting hole, and the smaller bore diameter of the gas charging counterbore is smaller than the bore diameter of the spring mounting hole; the outer diameter of the valve core is larger than the smaller bore diameter of the gas charging counterbore, and the outer diameter of the valve core is smaller than the bore diameter of the spring mounting hole; the top end of the valve core is provided with a coaxial ejector pin that is inserted into the gas charging counterbore in a clearance fit; the middle of the gas charging valve plug is provided with a plug vent hole which is a through hole;

the gas charging valve body and the gas charging valve connector achieve a fixed connection through the matching threaded connection of the fixed threaded section and the fixed threaded hole; the valve core, the valve core return spring and the gas charging valve plug are fitted and mounted, in sequence from top to bottom, into the spring mounting hole of the gas charging valve body; the ejector pin of the valve core is inserted into the smaller bore of the gas charging counterbore in a clearance fit and further into the larger bore of the gas charging counterbore; the gas charging valve plug matches and is fixed to the bottom end of the spring mounting hole; and the valve core return spring is disposed between the bottom end of the valve core and the top end of the gas charging valve plug.

17. The beverage preservation keg with an adjustable beer tap according to claim 16, wherein the valve core comprises the ejector pin, a sealing ring and a core body; the top end of the core body is provided with a receiving counterbore which is not a through hole; an outer diameter of the sealing ring matches the larger bore diameter of the receiving counterbore, and a thickness of the sealing ring matches a larger bore depth of the receiving counterbore; the central hole diameter of the sealing ring matches the smaller bore diameter of the receiving counterbore; the bottom end of the ejector pin is provided with a coaxial receiving rod that matches the smaller bore of the receiving counterbore; and the sealing ring matches and is inserted into the larger bore of the receiving counterbore of the core body, and the receiving rod of the ejector pin runs through the central hole of the sealing ring and matches and is inserted into the smaller bore of the receiving counterbore.

18. A beverage preservation keg with an adjustable beer tap, wherein the beverage preservation keg with an adjustable beer tap comprises a shell, an inner container wrapped by the shell, and a gas-liquid control device; the inner container is divided into an upper layer and a lower layer, comprising an upper gas storage chamber for storing a gas and a lower beer storage chamber for storing a liquid; the gas-liquid control device comprises a keg spear with a pressure relief valve, a dispenser with a beer tap throttle valve, and a beer discharge pipe; the keg spear matches and connects the gas storage chamber and the beer storage chamber, and the top end of the keg spear matches and is connected to the dispenser; the dispenser is matches and is connected to the beer discharge pipe;

wherein the keg spear connects a gas passage from the gas storage chamber to the beer storage chamber; the keg spear, the dispenser and the beer discharge pipe connect a liquid passage pipe from the beer storage chamber to the outside; and the dispenser with the beer tap throttle valve is capable of controlling and adjusting a liquid flow of beer being discharged, wherein the shell comprises a casing, a base and a cover plate; the inside of the casing is provided with an inner container mounting hole matching the inner container of the draft beer preservation keg, and the outer side of the top end of the casing is provided with two symmetrically distributed lifting handles; the base is a socket ring matching and being fixedly connected to the bottom end of the casing; and the cover plate matches and is fixedly connected to the top end of the casing through a detachable structure and covers a top opening of the inner container mounting hole.

19. The beverage preservation keg with an adjustable beer tap according to claim 18, wherein the outer side of the top end of the casing is provided with an annular movable sleeve the outer side of the top end of the casing is further provided with a second annular snap groove, the inner side of the bottom end of the annular movable sleeve is provided with a second snap ring matching the second annular snap groove, and the annular movable sleeve achieves a detachable snap connection with the casing through the snap connection of the second snap ring to the second annular snap groove; the two lifting handles are integrally connected to the bottom end of the annular movable sleeve and symmetrically distributed; and the lifting handle is a curved plate coaxial with the annular movable sleeve and the side surface of the curved plate is provided with a lifting handle hole for hand insertion.

20. The beverage preservation keg with an adjustable beer tap according to claim 18, wherein the lifting handle is an n-shaped bent rod, and two opening ends at the bottom of the n-shaped bent rod match and are fixedly connected to the outer side of the top end of the casing; and the two n-shaped bent rods are symmetrically distributed on two sides of the top end of the casing.

21. The beverage preservation keg with an adjustable beer tap according to claim 18, wherein a top end opening of the inner container mounting hole is provided with a fixedly connected, matching annular liner; an inner hole wall of the annular liner is provided with at least two first inclined protruding strips uniformly distributed in a circular array with its axial line as an axis; the outer side of the cover plate is provided with matching second inclined protruding strips that correspond individually to each of the inclined protruding strips, and all the second inclined protruding strips are uniformly distributed in a circular array with the axial line of the cover plate as an axis; and the cover plate achieves a detachable fixed connection with the casing at the top end of the casing through an axially limiting connection between the first inclined protruding strips and the second inclined protruding strips.

* * * * *